United States Patent [19]

Ishida et al.

[11] 3,958,828
[45] May 25, 1976

[54] RECLINING SEAT DEVICE FOR MOTOR CAR

[75] Inventors: Hideo Ishida; Chusaku Yamanashi, both of Kosai, Japan

[73] Assignees: Fuji Kiko Kabushiki Kaisha, Tokyo; Ikeda Bussan Kabushiki Kaisha, both of Japan

[22] Filed: Nov. 29, 1973

[21] Appl. No.: 420,164

[30] Foreign Application Priority Data
Feb. 14, 1973 Japan.............................. 48-19954
Mar. 28, 1973 Japan.............................. 48-37650
June 12, 1973 Japan.............................. 48-66530

[52] U.S. Cl............................... 297/355; 297/367; 297/369
[51] Int. Cl.²............................................. A47C 3/00
[58] Field of Search........... 297/356, 366, 367, 368, 297/369, 370, 371, 372, 355; 16/164, 142, 145

[56] References Cited
UNITED STATES PATENTS 3,051,526  8/1962  Werner et al....................... 297/367
3,333,891  8/1967  Werner et al....................... 297/367

FOREIGN PATENTS OR APPLICATIONS
1,530,519  8/1969  Germany........................... 297/366
1,580,017  1/1970  Germany........................... 297/366
1,405,786  1/1969  Germany........................... 297/366
1,042,181  9/1966  United Kingdom................. 297/369

*Primary Examiner*—James T. McCall
*Attorney, Agent, or Firm*—Haseltine, Lake & Waters

[57] ABSTRACT

A reclining seat device including a fixed seat cushion base having a horizontal shaft and a seat back arm supported upon said base so as to be rotatable around the horizontal shaft. The seat back arm and the base are respectively provided with serrations, which are connected to each other under normal conditions. A release lever pivotably supported at the horizontal shaft includes means for releasing the connection of said seat back arm with the base when the release lever is turned, whereby the seat back may be rotatable around the horizontal shaft. The release lever is also provided with a return spring, and accordingly by adjusting the seat back at a suitable angle and releasing the release lever, the seat back may be set at a desired angle position.

21 Claims, 30 Drawing Figures

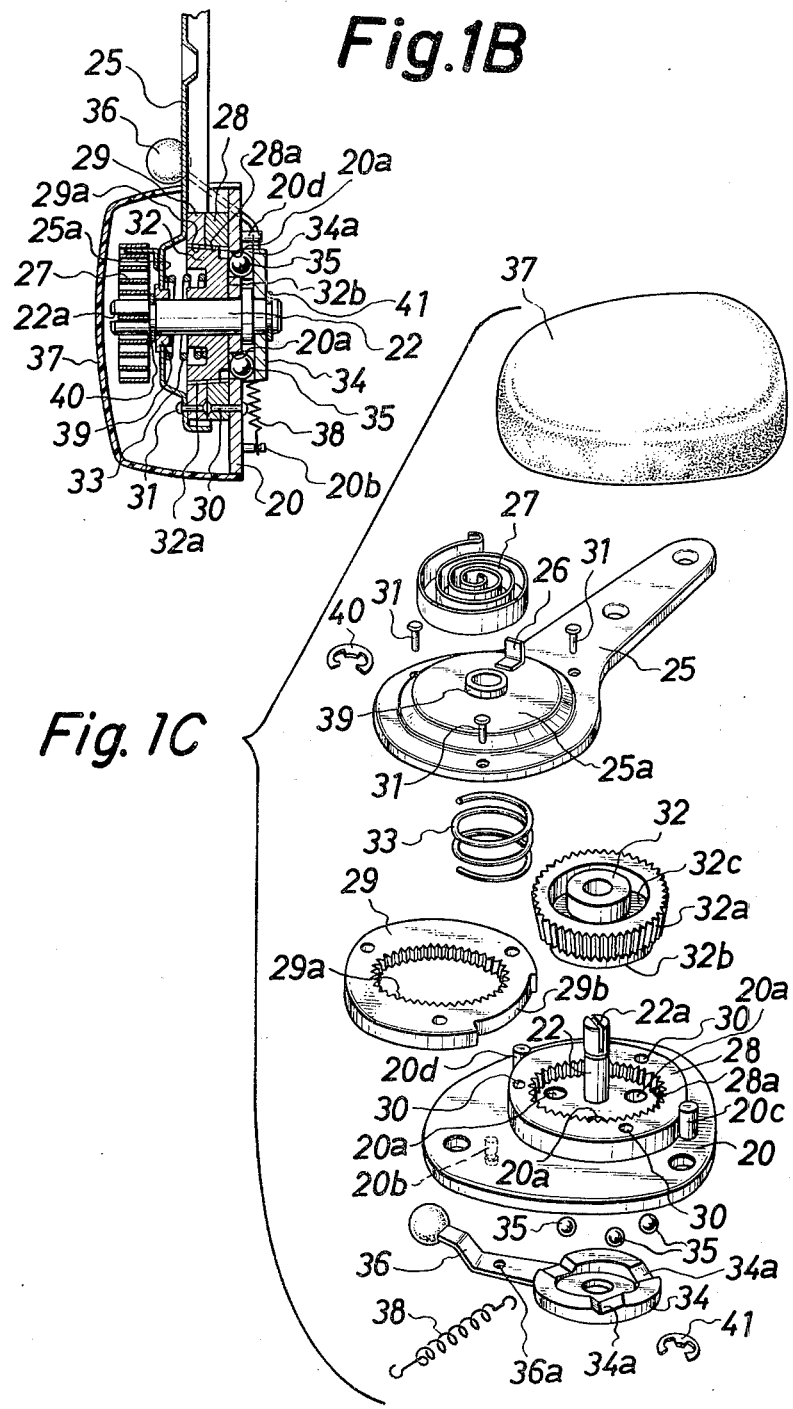

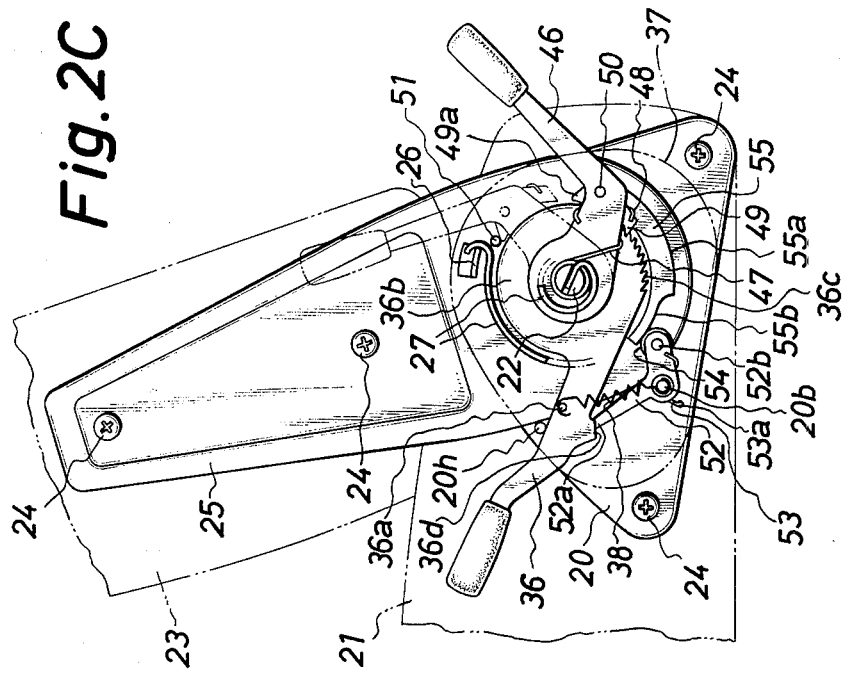
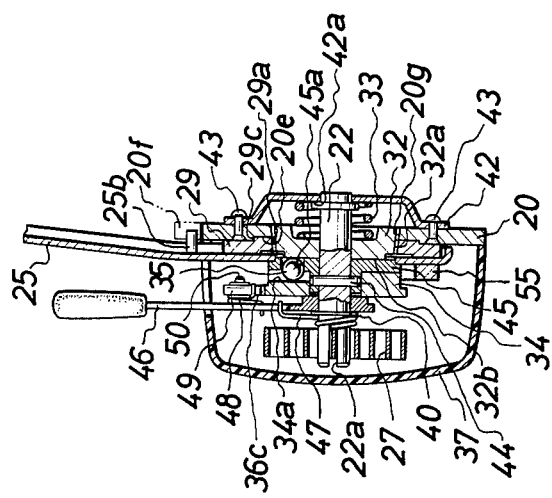

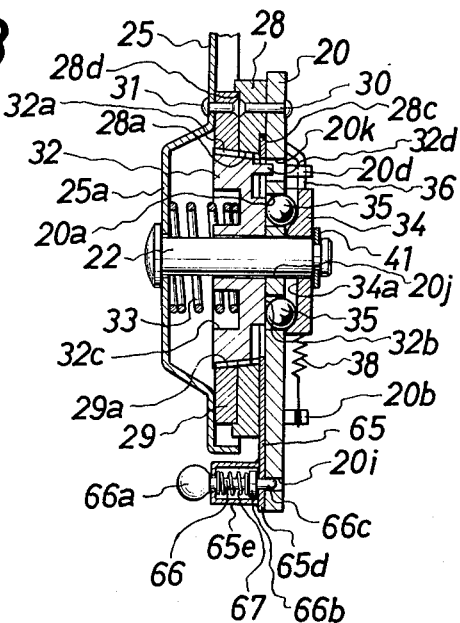
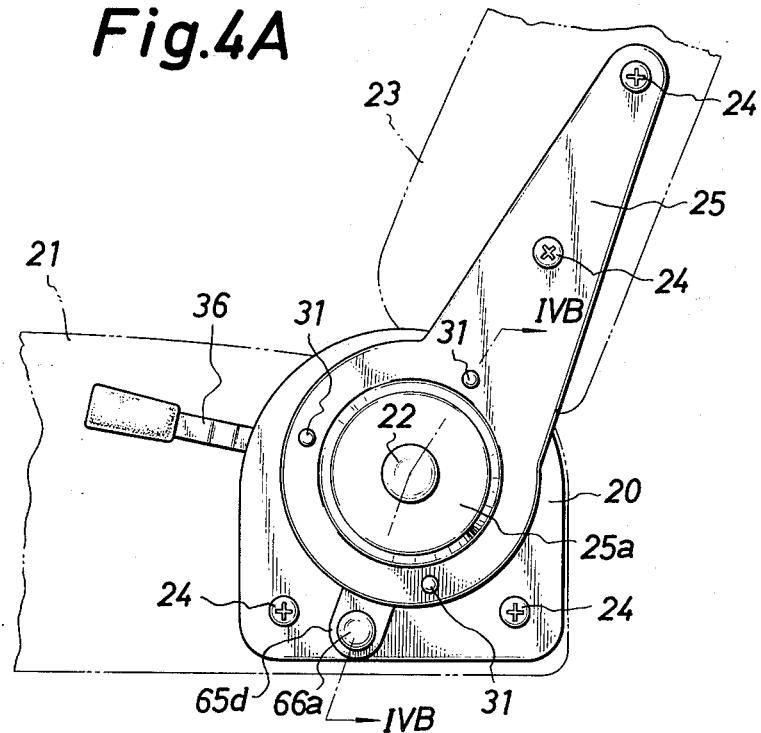

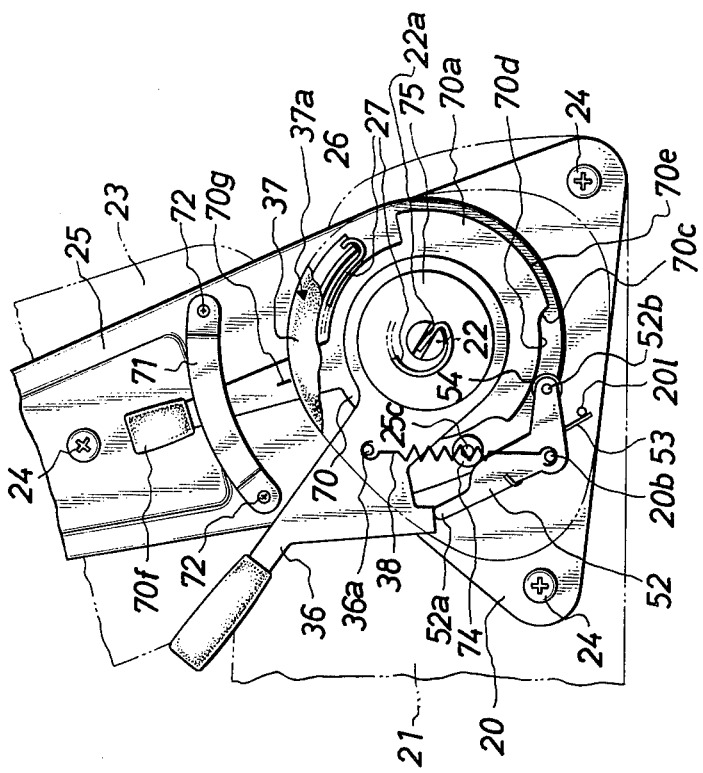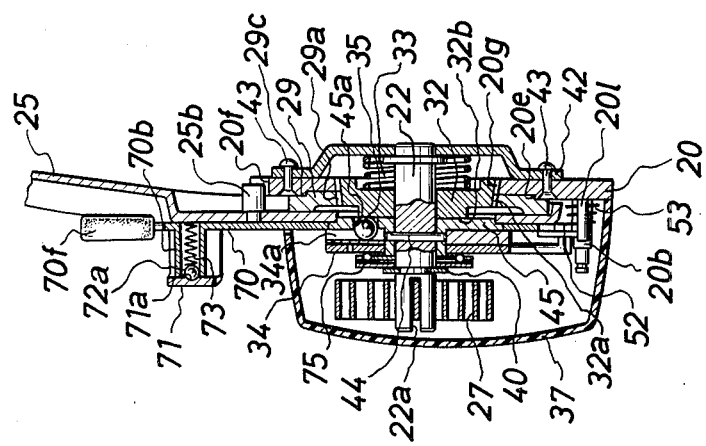

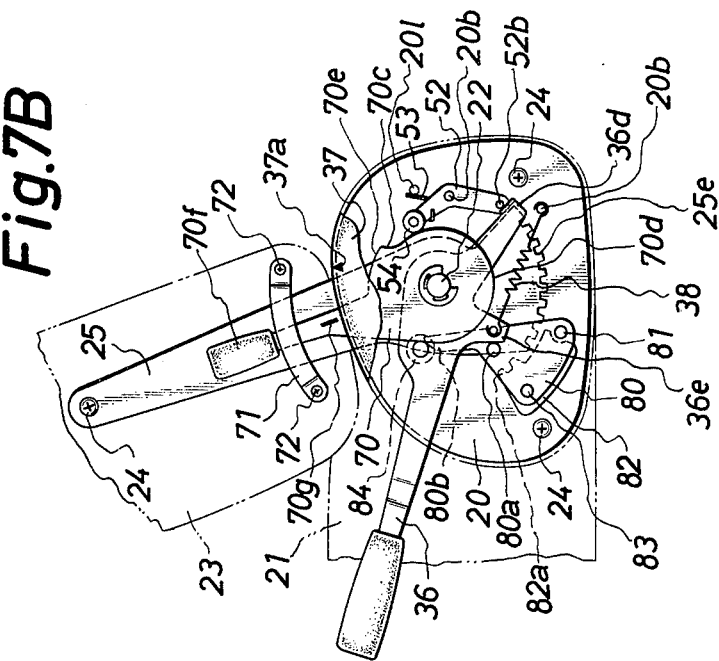
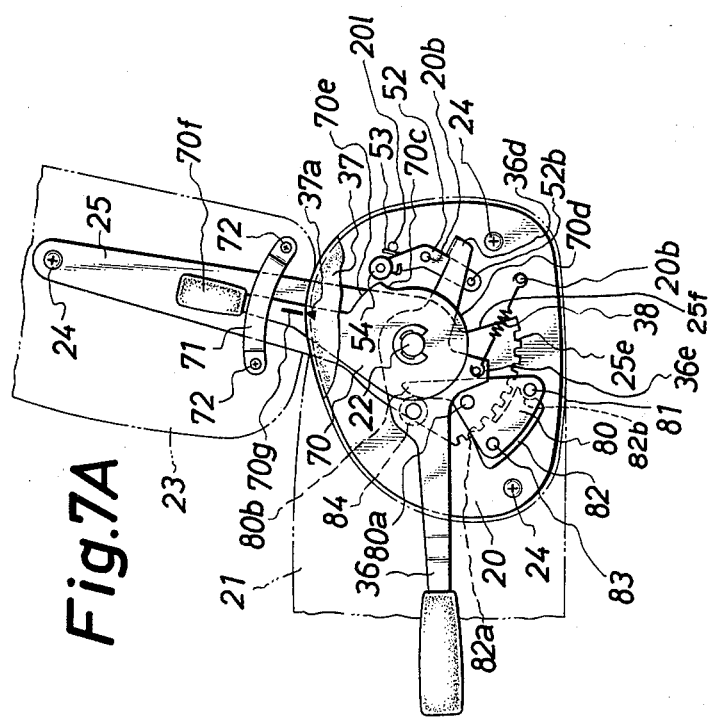

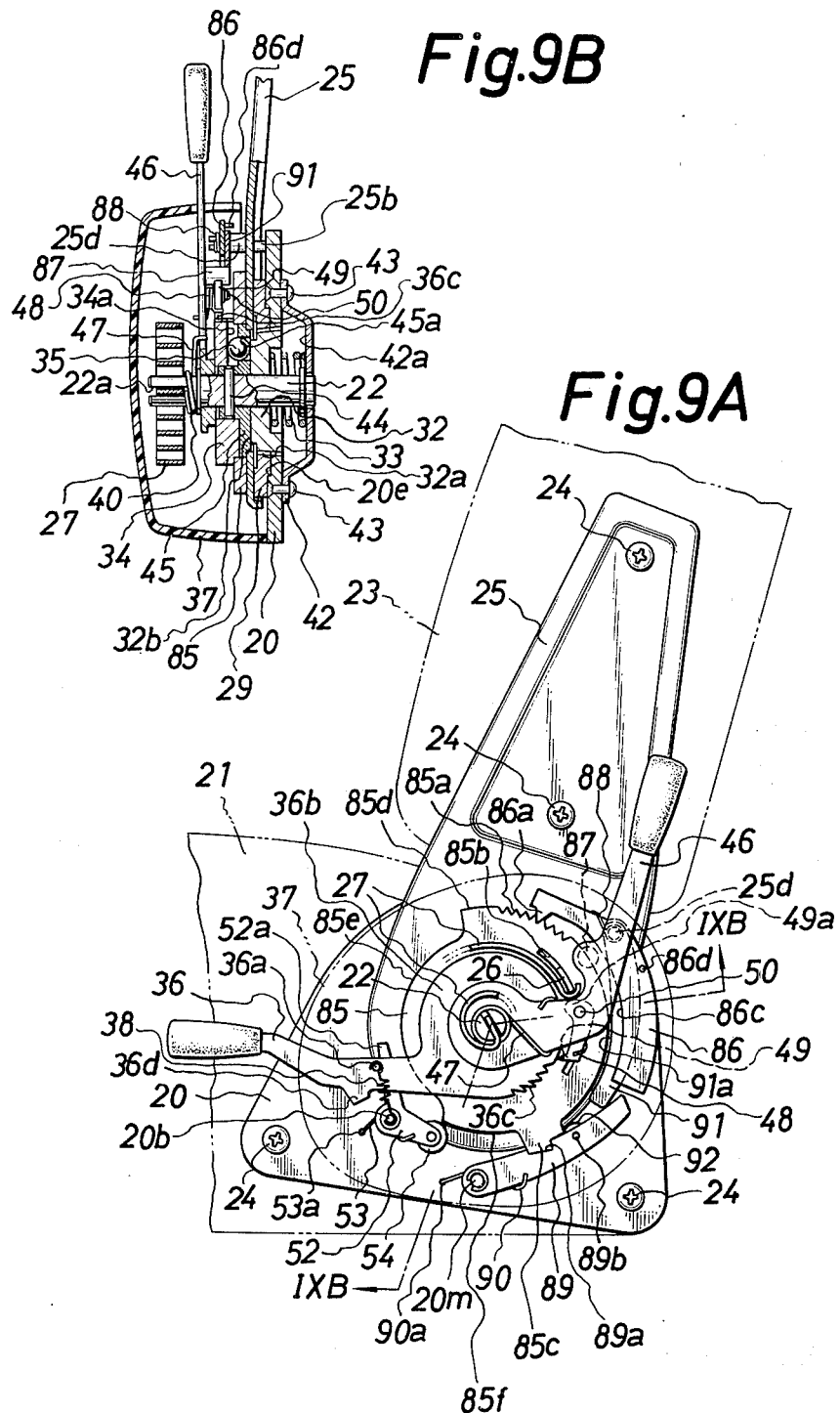

RECLINING SEAT DEVICE FOR MOTOR CAR

BACKGROUND OF THE INVENTION

This invention relates to a seat device for a vehicle such as a motorcar and the like, and more particulary to a reclining seat device for adjusting the angle of the seat back to a desired degree.

The reclining seat device is usually disposed in a position where the seat cushion is connected to the seat back and a device by which a driver or passenger can rotate and adjust the seat back at a suitable angle as he likes. Accordingly, when the seat back is adjusted and locked at a desired angular position, the reclining device must withstand a certain load given by the seat back per se with no unsteadiness.

There are some seat back inclining devices heretofore used, wherein serrations are formed on the outer circumference of the root end of a seat back arm attached to the seat back and clicks meshable with said serrations are also provided on a base plate, for the purpose of locking the seat back to the seat cushion. As this seat back inclining device resists the energy of about 75 kilogram-meters, the load problem may be left out of consideration in the usual condition of use. However, in case not only a seat belt is provided spanning the seat cushion at the upper portion of the seat back, but an air bag is also equipped on the back surface of the seat back, an excessively great energy, on collision acts forward on the seat back instantaneously through said seat belt and the air bag. Therefore, it is required that the lock structure should withstand the energy of the order of at least 500 to 1000 kilogram-meters.

Consequently, an object of the present invention is to provide an improved seat back inclining device in which the adjusting and setting of the seat back at a desired angle is easily and securely effected and the load withstanding performance is high in the locked condition of the seat back.

Another object of the present invention is to provide a seat back inclining device for use with the so-called two door type motorcar, in which getting on and off the rear seat is performed by opening a side door for the front seat and inclining forward the back of the front seat, wherein the forward inclining of the front seat back may be effected either from the front seat or from the rear seat.

A further object of the present invention is to provide a seat back inclining device including a rear lever for handling the front seat back which is easily operative and does not obstruct the passage even in the inclined state.

However, when the seat back is returned from the inclined position to the original set position, it has an inconvenience that the return to the original set position can not be performed automatically.

With due regard to the above inconveniences, yet another object of the present invention is to provide a seat back inclining device including memory means for automatically and instantly returning the seat back to the previously memorized standing position from the inclined position thereof.

A further object of the invention is to provide a reclining device easily operatable for a passenger at the rear seat and including memory means for automatically returning and locking the seat back to a set position after being inclined.

Briefly, the seat back inclining device according to the present invention includes a fixed seat cushion base provided with a horizontal or transverse shaft and a seat back arm supported upon said base so as to be rotatable around the transverse shaft. The seat back arm and the base are provided with serrations respectively which are normally meshed with each other. A forward release lever is pivotably supported at the horizontal shaft and includes means for releasing the engagement between said seat back arm and said base. When the release lever is turned clockwise around the horizontal shaft, the engagement between said seat back arm and said base is released, and then the seat back may be rotatable around the transverse shaft.

The release lever is provided with a return spring, and accordingly by adjusting the seat back at a suitable angle and letting off the release lever, the seat back may be set at a desired angle position.

The seat back inclining device according to the present invention may include a handling means for a passenger at the rear seat to incline the back of the front seat. Said handling means includes the back lever which is rotatably attached to said transverse shaft and is easily operatable by the passenger at the rear seat. Said back lever includes means engageable with to the front release lever, which, when turned clockwise, is engaged with to the front lever to turn the front lever clockwise, thus releasing the engagement between the seat back arm and the base.

Further the reclining seat device according to the present invention may include memory means typically formed in a substantially ring-shaped member rotatably and concentrically arranged around the transverse shaft, a cam portion being provided on the external circumference of the ringed member. When the angle of said seat back arm relative to said base becomes a fixed degree, another member associated with said cam portion may return the forward release lever, and then returns said seat back arm to a desired position.

Other objects and advantages of the invention will become apparent from the following descriptions taken in connection with the accompanying drawings.

Further, the same reference symbol throughout the drawings is used to indicate the same and similar parts.

FIG. 1B is a cross-sectional view taken on line 1B—1B in FIG. 1A;

FIG. 1C is an exploded view in perspective of said inclining device;

FIG. 2B is a partially sectional view taken on line IIB—IIB in FIG. 2A;

FIG. 2C is a side view of showing the state of the seat back in FIG. 2A;

FIG. 4A is a fourth embodiment according to the present invention including a memory mechanism, which shows the upstanding state of the seat back;

FIG. 4B is a partial sectional view taken on line IVB—IVB in FIG. 4A, which shows a locking member engaged with the memory parts;

FIG. 5B is a fragmentary partially sectional view taken on line VB—VB in FIG. 5A;

FIG. 5C is an exploded view in perspective of a fifth mebodiment, a part of which is shown in a fragmentary from;

FIG. 5D is a side view of the seat back at the inclined state;

FIG. 7A is a partially broken-away side view of a seventh embodiment with a memory device, according to the present invention, which shows the seat back in the upstanding state;

FIG. 7B is a view similar to FIG. 7A, but showing the seat back laid forward;

Figures 9C, 9D:
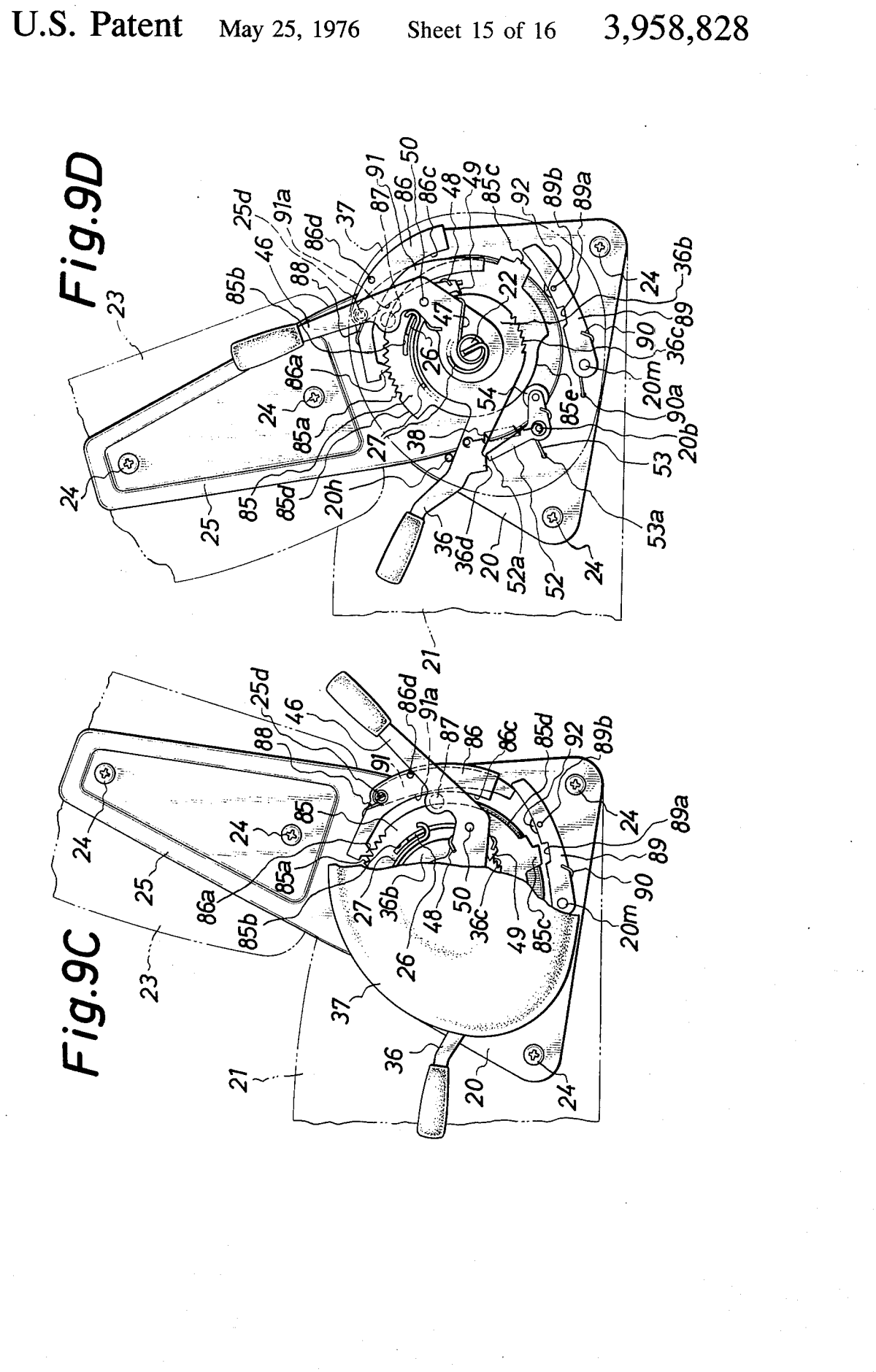

FIG. 9A is a side view of a ninth embodiment according to the present invention including the memory mechanism and the back handling mechanism, which shows the upstanding state of the seat back;

FIG. 9B is a fragmentary sectional view taken on line IXB—IXB in FIG. 9A;

FIG. 9C is view similar to FIG. 9A, but showing the instant state at which the lock of the memory mechanism is released, a part of which is shown broken away;

FIG. 9D is a side view of a ninth embodiment which shows the inclined state of the seat back;

DESCRIPTION OF PREFERRED EMBODIMENTS

Figure 1A:
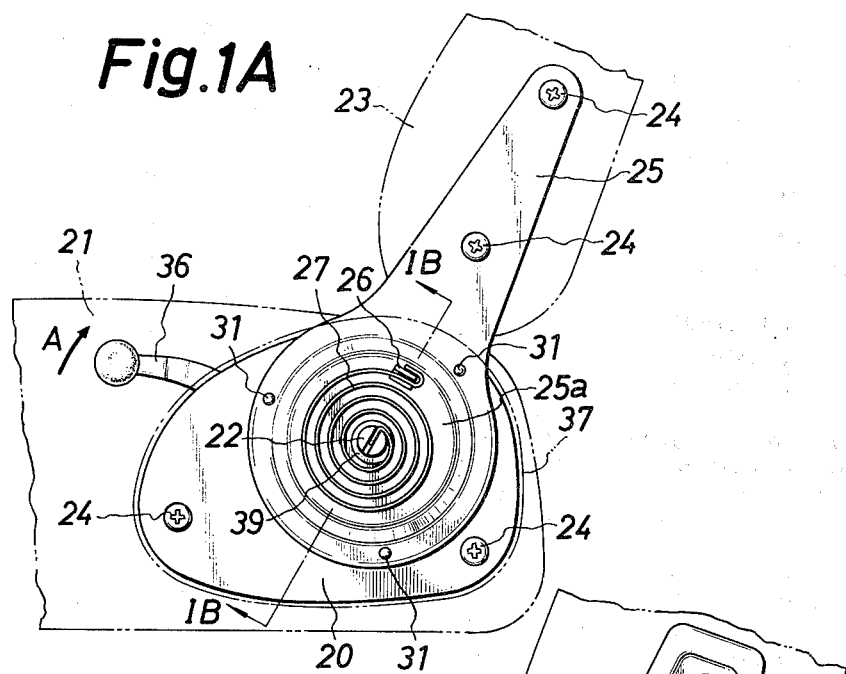
FIG. 1A is a side view of the seat inclining device according to the present invention which shows the seat back at the initial position.
Figure 2A:
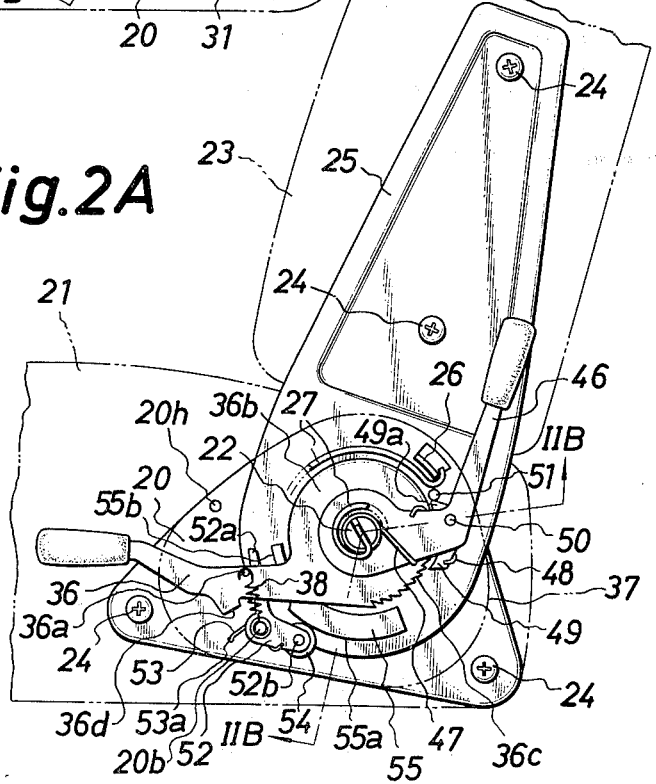
FIG. 2A is a side view of a second embodiment according to the present invention including a back lever, which shows the seat back at the initial position.
Figure 2D:
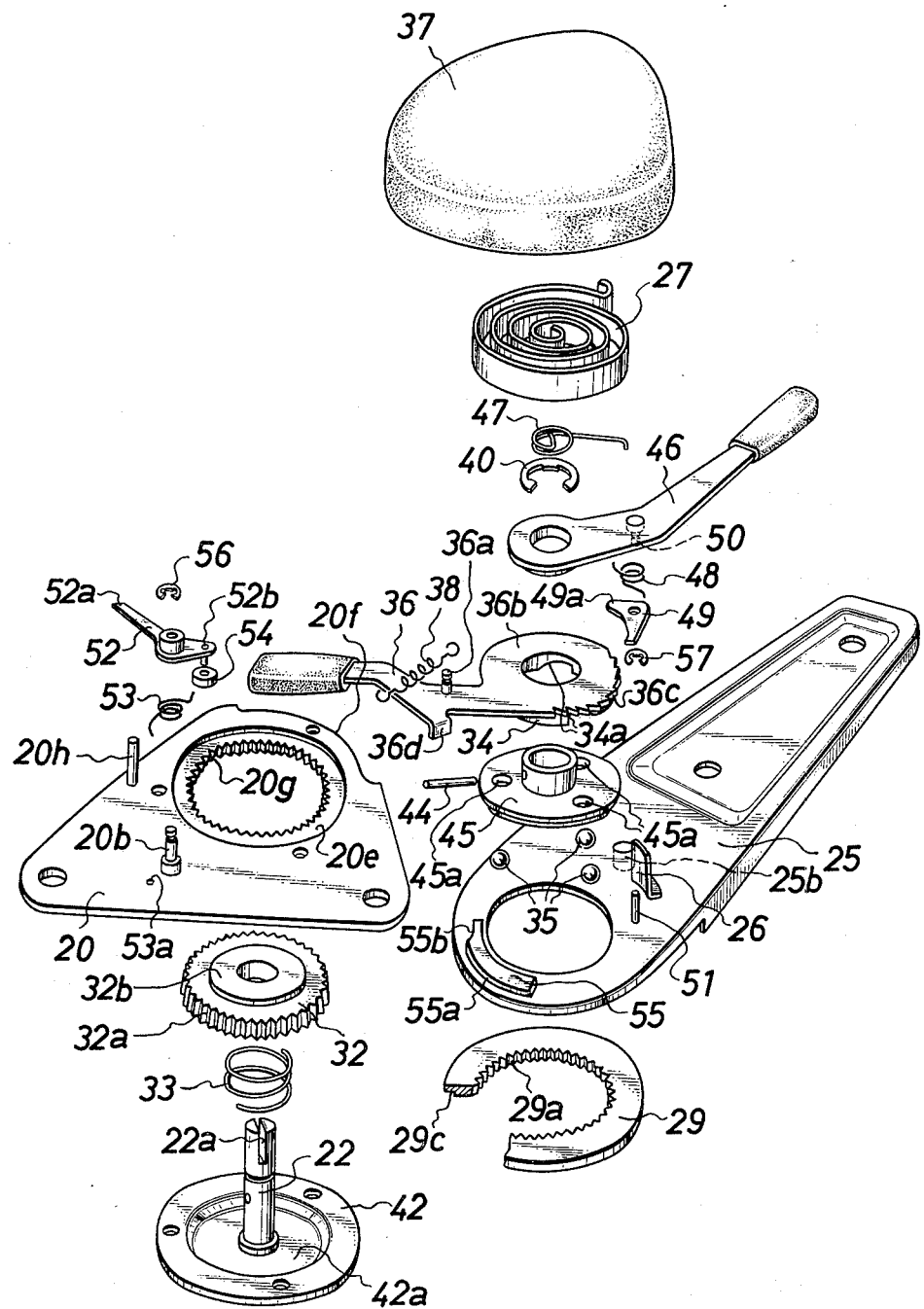
FIG. 2D is an exploded view in perspective of the second embodiment, part of which is shown in a fragmentary form.

Referring to FIGS. 1A, 1B and 1C, there is shown a seat back inclining device of the first embodiment of the present invention. Numeral 20 is a base plate fixed by a screw 24 to the lateral rear end of a seat cushion 21 and a horizontal shaft 22 is attached to said base plate 20 at one end thereof. An arm 25 fixed to a side surface of a seat back 23 by a screw 24 at its arm portion is pivotably mounted on to said shaft 22 at its disk portion. A rotating tendency in the inclining direction (clockwise direction in FIG. 1A) is always given to said arm 25 by connecting respectively both ends of a spiral spring 27 to a hook 26 on the disk portion of said arm 25 and to a groove 22a on one end of said shaft 22.

As is clearly shown in FIG. 1B, two ring-shaped bodies 28, 29 are respectively fastened to said base 20 and to said arm 25 by rivets 30, 31. Said ring-shaped bodies 28, 29 are respectively provided with openings concentric with said shaft 22 the openings being provided with serrations 28a, 29a which extend axially and have the same number of teeth, the same pitch and the same taper direction respectively on the inner circumferential surface of the openings. On the shaft 22, a substantially disk-shaped lock part 32 or bevel gear is rotatably and axially slidably fitted and a tapered serration 32a partially engageable with said serrations 28a, 29a of the ring-shaped bodies 28, 29 is formed on the external circumference of said lock part 32 or bevel gear. Said lock part 32 mounted on to said shaft 22 is enclosed in the space between said base plate 20 and a convex portion 25a of said arm 25. When said lock part 32 and said ring-shaped bodies 28, 29 are put into connection with each other, the smaller diameter end face 32b of the lock part 32 closely approaches the base plate 20. On the other hand, a coil spring 33 is provided in the space around the shaft 22 between said convex portion 25 a of the arm 25 and the lock part 32, the right end of the spring 33 being received in a ring-shaped concave portion 32c provided in the larger diameter end face of the lock part 32. Owing to said spring 33, the lock part 32 is axially pushed from the side of the larger diameter end surface to the side of the smaller diameter end surface thereof, namely in the direction in which the lock part 32 and the ring-shaped bodies 28, 29 should be put into gear connection. On that part of the shaft 22 projecting from the opposite face of the base place 20, a cam body 34 with a plurality of inclined or cam faces 34a is pivotably mounted. Between the inclined faces 34a of said cam body 34 and the smaller diameter end face 32b of said lock part 32, balls 35 such as a steel ball are loosely inserted one for each cam face in holes 20a bored in the base plate 20. When said cam body 34 is turned, each ball 35 is moved toward the lock part 32. Accordingly, the lock part is moved correspondingly from the smaller diameter end surface side to the larger diameter end surface side thereof (in the left hand direction in FIG. 1B), and thus the connection between the lock part 32 and the ring-shaped bodies 28, 29 will be released. Further, numeral 36 is a forward releasing lever fastened to the cam body 34 and numeral 37 is a dust-cover covering said inclining device. Numeral 38 is a return spring fastened at its both ends respectively to a hole 36a (a projecting hook may be provided) of the lever 36 and to a pin 20b of the base plate 20. Accordingly, said lever is forced to turn to a fixed position by the counter-clockwise turning tendency (in FIG. 1A) of said spring. Numeral 39 is a bearing boss member inserted into the opening of the bearing for the convex portion of the arm 25. Numerals 40, 41 are snap rings for slip prevention means fitted respectively on both end portions of the shaft 22 and numeral 20c is a pin fixed on the base plate 20, which restricts the turning of the arm 25 the range of a groove 29b formed partially on the external circumference of said ring-shaped body 29. Numeral 20d is a pin for restricting the working range of the lever 36.

In operation, when the lever 36 is pulled up in the direction of the arrow (clockwise direction) in FIG. 1A, the cam body 34 turns in the same direction, and the ball 35 is pushed out toward the lock part side 32 by the inclined faces 34a of the cam body 34. Then, the lock part 32 is axially moved from the side of the smaller diameter end surface to the side of the larger diameter end surface thereof against the spring 33, and accordingly, the gear connection of the lock part 32 with the ring-shaped bodies 28, 29, namely, the lock of the arm 25 is released. Correspondingly, the ring-shaped bodies 28, 29 thus released from the gear connection with the lock part 32 may be freely turnable relative to each other. Accordingly, the base plate 20 and the arm 25 may be also freely turnable relative to each other. Then, as the arm 25 has always a tendency to turn in the forward direction owing to the spiral spring 27, the seat back may be brought down forwardly if a backward force against the spring 27 is not applied to the seat back. Thereupon, by setting the seat back at a desired angular position and releasing said lever, the lock part 32 will be once again automatically put into gear connection with the ring-shaped bodies 28, 29 by the coil spring 33, and thus the inclining angle of the seat back may be determined to a desired value. Further, in order to return the seat back to the normal position, after the gear connection of the ring-shaped bodies 28, 29 with the lock part 32 is released by the same operation of the lever 36 as described above, it is only necessary to push the seat back fully to the normal position and then release the lever 36.

Briefly, according to this embodiment, only with the turning operation of the lever 36, the seat back 23 may be set at a desired angle by turning the arm 25 relative to the base plate 20. Further, as the arm 25 is locked to the base plate by the gear connection between the serration of the external circumference of the lock part 32 and the serrations of the inner circumferences of the ring-shaped bodies 28, 29, even if an excessive load will be applied to the arm, said load may be dispersed by the gear connection of said serrations. Accordingly, the stiffness of the device may be greatly increased. Moreover, as the lock part 32 tends to be engaged with said ring-shaped bodies 28, 29 and said ring-shaped bodies 28, 29 are contacted with each other, there is no play therebetween. Accordingly the device of the invention may be formed in a simple and strong structure with no needless play involved. Further, as the arm is directly pivoted at the shaft 22 and the turning member and the fixed member are formed independently, each movement of the turning member may be easily and smoothly effected.

Referring to FIGS. 2A, 2B, 2C and 2D, there is shown a second embodiment of the present invention, including means by which a passenger at the rear seat can set the back of the front seat at a desired angle. As is clearly seen from FIG. 2B, according to this embodiment, the arrangement of cam body, ball, lock part and so forth is axially reversed from that shown in the first embodiment.

Referring first to FIG. 2B, a ring-shaped body 29 is fastened to the side surface of one end of the seat back arm 25 by welding or the like and the right lateral side of said ring-sahped body 29 includes a circularly protruding portion 29c which is freely turnably inserted into a depression 20e of the left lateral side of the seat cushion base plate 20. A pin 25b fastened to the seat back arm 25 and a notch 20f formed on one portion of the external circumference of the seat cushion base 20 for receiving the pin 25b therein cooperate to limit the working range of the seat back arm 25.

The ring-shaped body 29 and the seat cushion base 20 are respectively provided with a hole concentrical with the shaft 22 and axially tapered (the taper direction is reversed to that shown in FIG. 1B), the hole having serrations 29a, 20g formed on the inner circumferential surface thereof. A plate 42 firmly attached to the shaft 22 includes a convex portion protruding on the ring hand of FIG. 2B for receiving the lock part 32 and is fastened to the seat cushion base 20 by a rivet 43 and the like. A lock part or connector 32, which includes on its external circumference a taper serration 32a engageable with the serrations 29a and 20g, is provided slidable axially on the shaft 22 and freely turnable around said shaft 22. The lock part 32 is normally put into gear connection with the members 29 and 20, by the spring 33. Steel balls 35 are loosely inserted in a plurality of holes 45a respectively of a guide plate 45 fastened by a knock pin 44 or the like to the shaft 22 at the boss portion of the guide plate fitted on the shaft 22 on the side of the left side surface of the lock part 32. The balls also lie between the smaller diameter end face 32b of the lock part 32 and a plurality of cam faces 34a of a cam body 34 turnably mounted on the shaft 22 on the left hand side of the guide plate 45. Said cam body is fastened to a front releasing lever 36 and is adapted to release through the steel balls 35 the lock part 32 from the ring-shaped body 29 when the lever 36 is turned clockwise in FIG. 2A. As is clearly shown in FIG. 2B, the right lateral side of the guide plate 45 is provided with a circumferentially concave portion for supporting the arm 25. Numeral 20h is a stopper provided on the base 20 for limiting the working range of the lever 36.

On one portion of the external circumference of the circular plate portion 36b of the front lever 36, there is provided a ratchet 36c. A back releasing lever 46 is pivotably supported at the shaft 22 with the tendency for counterclockwise movement in FIGS. 2A and 2C by a spring 47 fastened at its one end to a groove 22a formed on the left end (in FIG. 2B) of the shaft 22. Midway of the length of said back lever, a front lever clutch 49 is pivotably supported at a pin 50 on the back lever 46, said front lever clutch including a ratchet pawl having a tendency to clutch said ratchet 36c by a pawl spring 48 (connected to the back lever 48 at its one end). As the spring constant of said spring 47 is larger than that of the pawl spring 48, when one end 49a of the front lever clutch 49 abuts the stopper 51 secured to the seat back arm 25, said front lever clutch turns counterclockwise and the gear connection of the clutch with the ratchet 36c is released. Further, as said one end 49a also contacts the circumference of the circular plate portion 36b of the forward lever 36, the back lever 46 is set at a fixed angular position relative to the seat back arm 25 when it is releived.

An L-shaped stop lever 52 is turnably mounted at a lever pin 20b of the base 20 with a tendency to move counterclockwise (in FIG. 2A) by a spring 53 fastened to the base plate 20 at its one end 53a. In a state under which the seat back 23 is not inclined forward, a roller 54 pivoted by a pin 52b at one end of the stop lever 52 contacts the greater diameter circumference of the external portion 55a of an arcuate cam plate 55 fastened on the face of the seat back arm 25 concentrically with the shaft 22. When the seat back is inclined forwardly, the roller 54 moves radially inward on the outer circumference of the smaller diameter portion of the cam plate. The stop lever 52 then moves counterclockwise moves around the pin 20b and another end 52a of the stop lever 52 engages a hook 36d provided on a side edge of the front lever 36, and thus said lever 36 is held in a released position. Numerals 56, 57 are slip preventing snap rings respectively for the stop lever 52 and the front lever clutch 49.

Figure 3A:
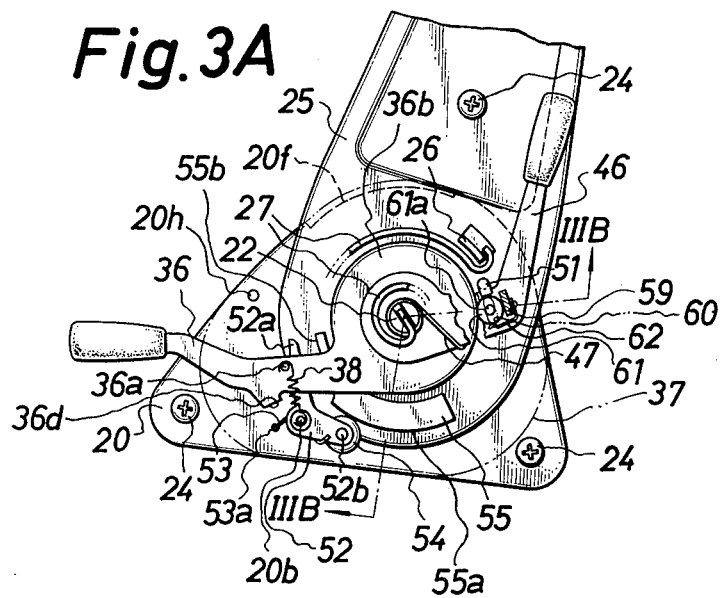
FIG. 3A is a fragmentary side view of a third embodiment according to the present invention including the back lever, which shows the seat back in upstanding state.
Figure 3B:
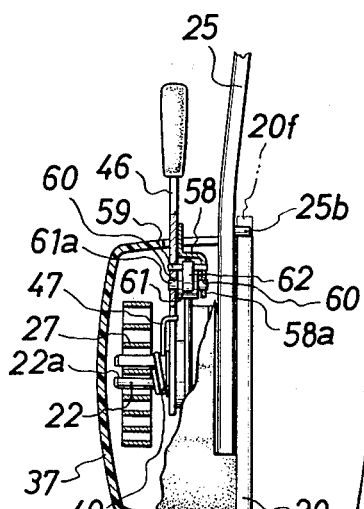
FIG. 3B is a partially broken-away sectional view taken on line IIIB—IIIB of FIG. 3A.
Figure 3C:
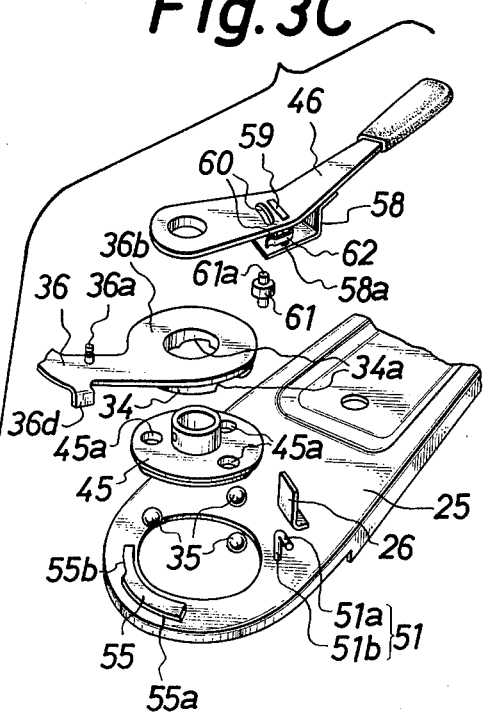
FIG. 3C is a perspective view of some of the exploded parts of the third embodiment, some of which are shown in a fragmentary form.

Referring next to FIGS. 3A, 3B and 3C, there is shown a third embodiment of the seat inclining device using a one way clutch instead of the ratchet and the ratchet pawl used in the second embodiment. As the construction portion of this embodiment (not shown) is the same as that shown in FIG. 2, the explanation therefor is omitted. On the back lever 46, a branch part 58 having a portion 58a extending parallel to said back lever is formed and a crossing plate 59 is supported by said back lever 46 and said parallel portion 58a. In elongated holes 60, 60 formed in the back lever 46 and the portion 58a respectively, a roller 61 is loosely received at both ends of the axle 61a thereof and is pushed against the external circumference of the circular plate portion 36b of the forward lever 36 as well as against the plate 59 by a plate spring 62 fastened at one end to said plate 59. The bent end portion 51a of a stopper 51 fastened to the seat back arm 25 normally contacts the roller 61 to prevent it from being pushed any longer respectively against the external circumference of the circular plate portion 36b of the forward lever 36 and against the plate 59. The base portion 51b of the stopper 51 contacts the back lever 46 and normally holds said lever at a fixed angular position relative to the seat back 23.

In operation, with respect to the devices shown in FIGS. 2A, 2B, 2C and 2D as well as in FIG. 3A, 3B and 3C, for regulating the usual angle of the seat back 23, firstly the front lever 36 is turned clockwise. The cam body 34 fastened thereto is then turned also in the same direction, and the cam faces 34a of the cam body cause the steel balls to move the lock part 32 axially right against the elasticity of the spring 33 and thus to release the gear connection of the lock part 32 from the ringshaped body 29. Consequently, the seat back is permitted to turn forwards by the coil spring 27. At this time, if one moves the seat back to a suitable angular position by his back or hands and then releases the front lever 36 to cause the same to be returned to the initial position, the seat is locked at that position, as the lock part 32 is put into gear connection with the ringshaped body 29. When the seat back 23 is moved backwards, the front lever clutch 49 is pushed counterclockwise (in FIG. 2A) by the stopper 51 and is not put into gear connection with the ratchet 36c.

Moreover, when one wants to get in and off the rear seat, he can draw the front lever clockwise in the same way as above-described. The gear connection of the lock part 32 with the ring-shaped body 29 then is released, and thus the seat back 23 is inclined forwardly to an angular position determined by the pin 25b and the notch 20f.

On the other hand, concerning the forward turn of the seat back 23 by the back lever 46, there is a difference in operation between the device shown in FIGS. 2A, 2B, 2C and 2D and that shown in FIG. 3A, 3B and 3C. Referring first to the device shown in FIGS. 2A, 2B, 2C and 2D, if the back lever 46 is drawn clockwise, then a counterclockwise force by the stoppr 51 ceases to act on the front lever clutch 49 and as a result the ratchet pawl 49 is put into gear connection with the ratchet 36c. When the back lever is further drawn clockwise, the front lever 36, engaged with the ratchet 36c, also turns in the same direction. Accordingly, as described above, the gear connection between the loc part 32 and the ringshaped body 29 is released, and thus the seat back 23 is inclined forwards. Then, if one releases the back lever, said lever will be returned to a position shown in phantom lines in FIG. 2C by the elasticity of the spring 47.

If the seat back comes to a position where it is inclined forwardly, the roller 54 of the stop lever 52 falls into the external circumference of the smaller diameter portion 55b of the cam plate 55 and the stop lever 52 moves counterclockwise with the pin 20b as a center. Then, the end portion 52a of the stop lever 52 engages the hook 36d provided on the side edge of the front lever 36, and thus said lever 36 is held in a release position. Accordingly, when the seat back is completely forwardly inclined, the seat back 23 is not locked. Therefore, in order to return the seat back to the normal upstanding angle, it should manually be pushed backwards. This causes the roller 54 to move from the external circumference of the smaller diameter portion 55b of the cam plate 55 to that of the larger diameter portion 55a to turn the stop lever 52 clockwise and release the engagement between the end portion 52a of the stop lever 52 and the hook 36d of the forward lever 36. Thus, immediately thereafter the front lever 36 returns to the original position and the seat back is locked thereat.

Referring next to FIGS. 3A, 3B and 3C, explanation is made concerning the case in which the seat back 23 is inclined forwardly by the back lever 46. When the back lever 46 manually drawn clockwise in FIG. 3A, the roller 61 is pressed respectively on the plate 59 and the external circumference of the circular plate portion 36b owing to the action of the plate spring 62. When the back lever 46 is turned further, the front lever 36 also turns in the clockwise direction, and accordingly the gear connection between the lock part 32 and the ring-shaped body 29 is released and the seat back is inclined forwardly. Then by releasing the back lever, said lever returns to a position such as shown in phantom lines in FIG. 2C by the elasticity of the spring 47.

Consequently, according to the embodiments shown both in FIGS. 2A, 2B, 2C and 2D and in FIGS. 3A, 3B and 3C, as the seat back can be forwardly inclined by a passenger at the rear seat in case he wants to get off the rear seat, there is no inconvenience of operating the forward release lever disposed on the side of the front seat cushion as shown in the device of FIGS. 1A, 1B and 1C. Further, as the back lever is normally situated at a fixed position relative to the seat back, it is easy to handle and will cause no obstacle to passage.

Referring to FIGS. 4A, 4B, 4C and 4D, there is shown a fourth embodiment including memory means. This embodiment is similar to that shown in FIGS. 1A, 1B and 1C except for the memory means. Accordingly, it will be sufficient to explain mainly the construction of the memory means which is not provided in the embodiment of FIGS. 1A, 1B and 1C.

Numeral 65 is a substantially ring-shaped memory plate and is supported turnably about the shaft 22 in the space between ring-shaped body 28 and base plate 20. For preventing the gear connection of a locking member or bevel gear 32 with ring-shaped body 28 when the seat back is inclined forwards as compared with the usual position, a plurality of radially internally projecting portions 65a are formed spaced equi-angularly from each other on said ring-shaped memory lever 65. On the end face 32b of the smaller diameter of the locking member 32 are provided a plurality of projections 32d extending toward the memory plate 65, corresponding to the projecting portions 65a of the memory plate 65. The length of said projections 32d is such that the locking member 32 should be disconnected from the ring-shaped body 28 when the ends of the projections 32d contact adjacent surfaces 65b of the projecting portions 65a.

On a radially externally projecting portion 65d of the memory plate 65, there is provided a pin receiving box 65e, in which a pin 66 having a knob 66a at its one end is received with said knob 66a exposed outside the box 65e. Further, in the box 65e, a spring 67 is inserted in the space between a boss portion 66b of said pin 66 and the left end wall of the box 65e and pushes said pin 66 to the right (in FIG. 4C). On the base 20, there is formed a plurality of adjusting holes 20i for adjusting the angular position of the memory plate 65. The right end 66c of said pin 66 is insertable in one of said adjusting holes 20i. Said adjusting holes 20i are situated in such positions that the locking member 32 and the ring-shaped body 28 should be put into gear connection with each other by the spring 33 immediately after the projections 32d of the locking member 32 come off from the lateral edges 65c of the projecting portions 65a respectively. Numeral 20k denote a plurality of arched grooves concentrically arranged around the shaft hole 20j and serving as escape grooves for the projections 32d of the locking member 32.

Referring additionally to the ring-shaped body 28, numeral 28b is a groove provided on a surface of the ringed body 28 facing the memory plate 65 and limiting the moving range of the memory plate 65. As is clearly seen in FIGS. 4B and 4C, numeral 28c is a concave recess for receiving the memory plate 65 and numeral 28d is a concave recess provided on the opposite surface of the body 28 for receiving the ring-shaped body 29 which is equivalent to the concave recess or depression 20e of the base 20 shown in the embodiment of FIG. 2B.

Figure 4C:
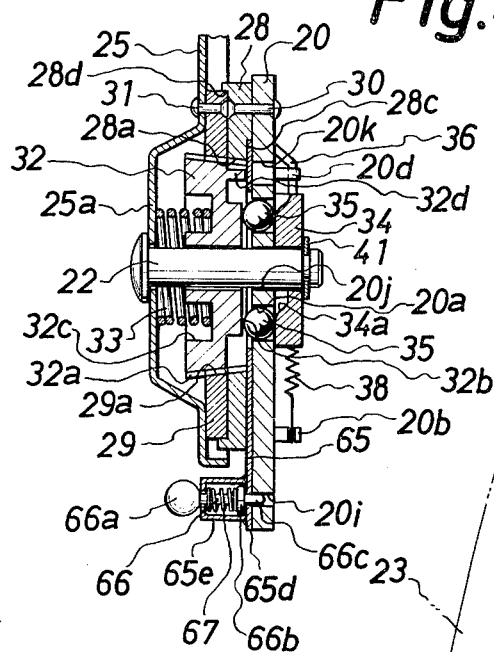
FIG. 4C is a view similar to FIG. 4B, but shows the locking member at the unlocked state.

In the operation of the embodiment in FIGS. 4A, 4B, 4C and 4D, when it is desired to memorize into this device an optimal angular position corresponding to the normal attitude of the seat back, a memory plate 65 is turned counterclockwise to a maximum degree in FIG. 4A. Thereafter, when forward releasing lever 36 is drawn clockwise, the gear connection of the locking member 32 with the ring-shaped body 28 is released as in the first embodiment, and thus the seat back 23 is turned forwards by a spring not shown (a spring similar to the spring 27 in FIG. 1A may be disposed between the left end of the shaft 22 (in FIGS. 4B and 4C) and the arm 25). When the forward lever 36 is returned after the seat back 23 is adjusted to a most suitable position, the locking member 32 and the ring-shaped body 28 may be put into gear connection with each other by the serrations 32a and 28a thereof, and thus the seat back 23 is locked at this position. Then, if the memory plate 65 is turned clockwise so far as the lateral edge 65c of the projecting portion 65b may touch the lateral surface 32e of the projections 32d on the locking member 32 and then the memory plate may be locked by inserting the pin 66 into a nearest hole 20i, the most suitable angular position of the seat back is memorized at the lateral edge 65c of the projecting portion 65a.

Next, explanation will be made of the case where the seat back is inclined forwards and then returned to the memorized position. In the first place, when the forward lever 36 is turned clockwise in FIG. 4A, as mentioned above, the gear connection of the locking member 32 with the ring-shaped body 28 is released and the seat back 23 is forwards inclined to a position where the end of a notch 29b formed on the outer circumference of the ring-shaped body 29 contacts a pin 28e of the member 28 (equivalent to the pin 20c in FIG. 1C). At this moment, the surface 65b of each projecting portion 65a provided on the memory plate 65 contacts the end of a corresponding projection 32d on the locking member 32, and therefore, the gear connection of the locking member 32 with the ring-shaped body 28 is obstructed. Thus even if the forward lever 36 is let off from the hand, the seat back can not be locked.

Then, when the seat back is backwards turned by the hand and the like, the projection 32d of the locking member 32 is off from the lateral edge 65c of the projecting portion 65a on the memory plate 65. Accordingly, the locking member 32 puts in gear connection with the ring-shaped body 28 owing to the spring 33, and then the seat back is locked at the memorized position.

Further, the adjustment of the angular position of the seat back in a range from the usual position to the most backward position may be performed by releasing the locking member 32 from the ring-shaped body 28 and then by engaging the former with the latter by means of the forward lever 36.

As is described above, according to the memory mechanism for storing the angle of the seat back of the present invention, an optimal angular position of the seat back may be memorized by a proper operation of the memory plate. Therefore, the seat back may be automatically locked at the most suitable angular position initially memorized and accordingly the reclining seat back may be always returned to the most suitable position.

Referring to FIGS. 5A, 5B, 5C and 5D, there is shown a fifth embodiment including memory means. Except for the memory means, the construction of this embodiment is more similar to that shown in FIGS. 2A, 2B, 2C and 2D than the shown in FIGS. 1A, 1B and 1C. Accordingly, the constructing members dissimilar to those in FIGS. 2A, 2B, 2C and 2D are mainly referred.

Figure 5A:
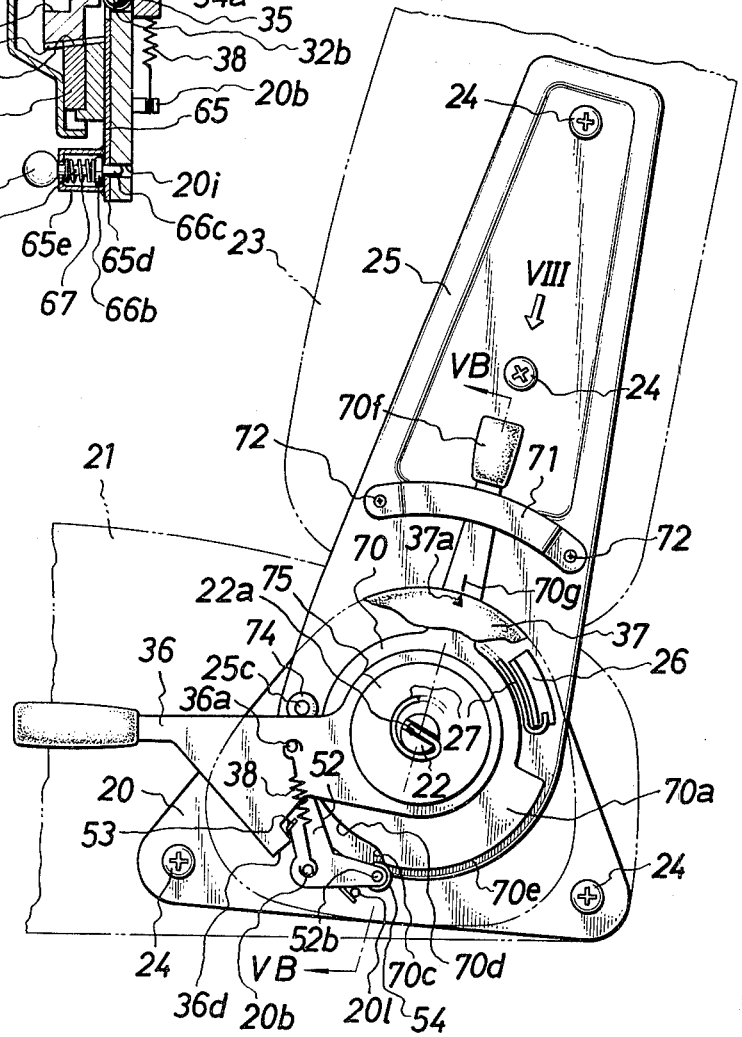
FIG. 5A is a side view of a fifth embodiment with a memory device, according to the present invention which shows the standing state of the seat back.
Figure 4D:
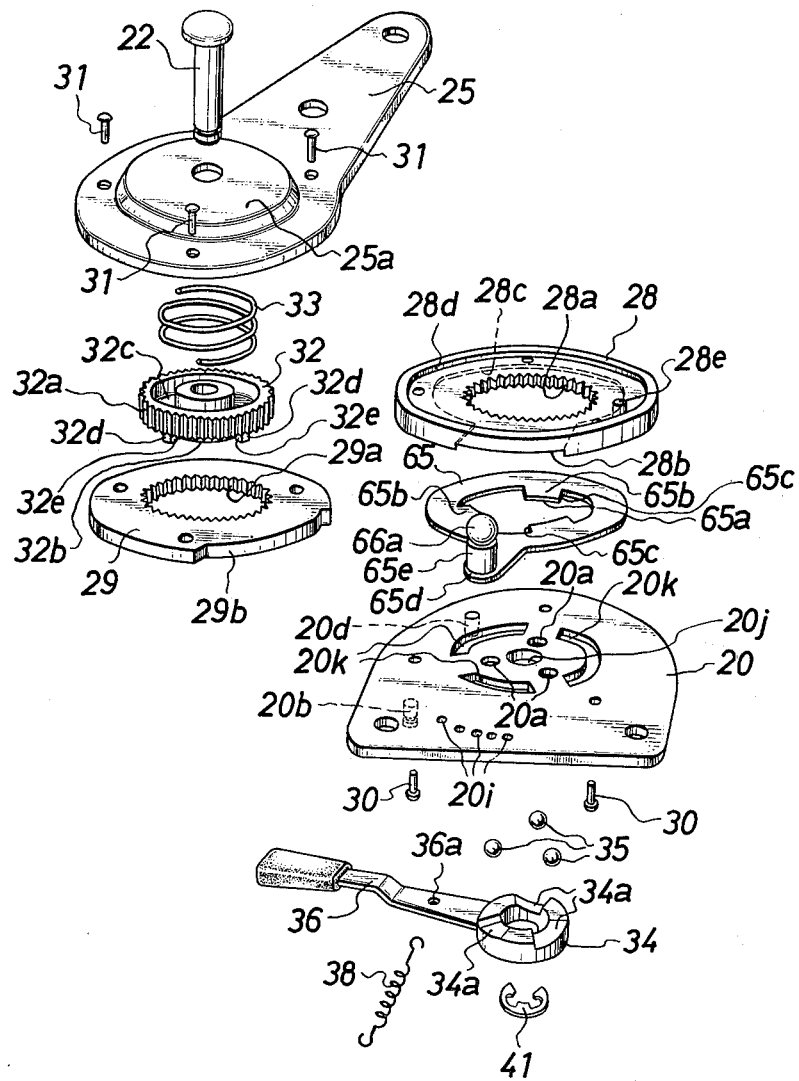
FIG. 4D is an exploded view in perspective of a fourth embodiment.
Figure 5C:
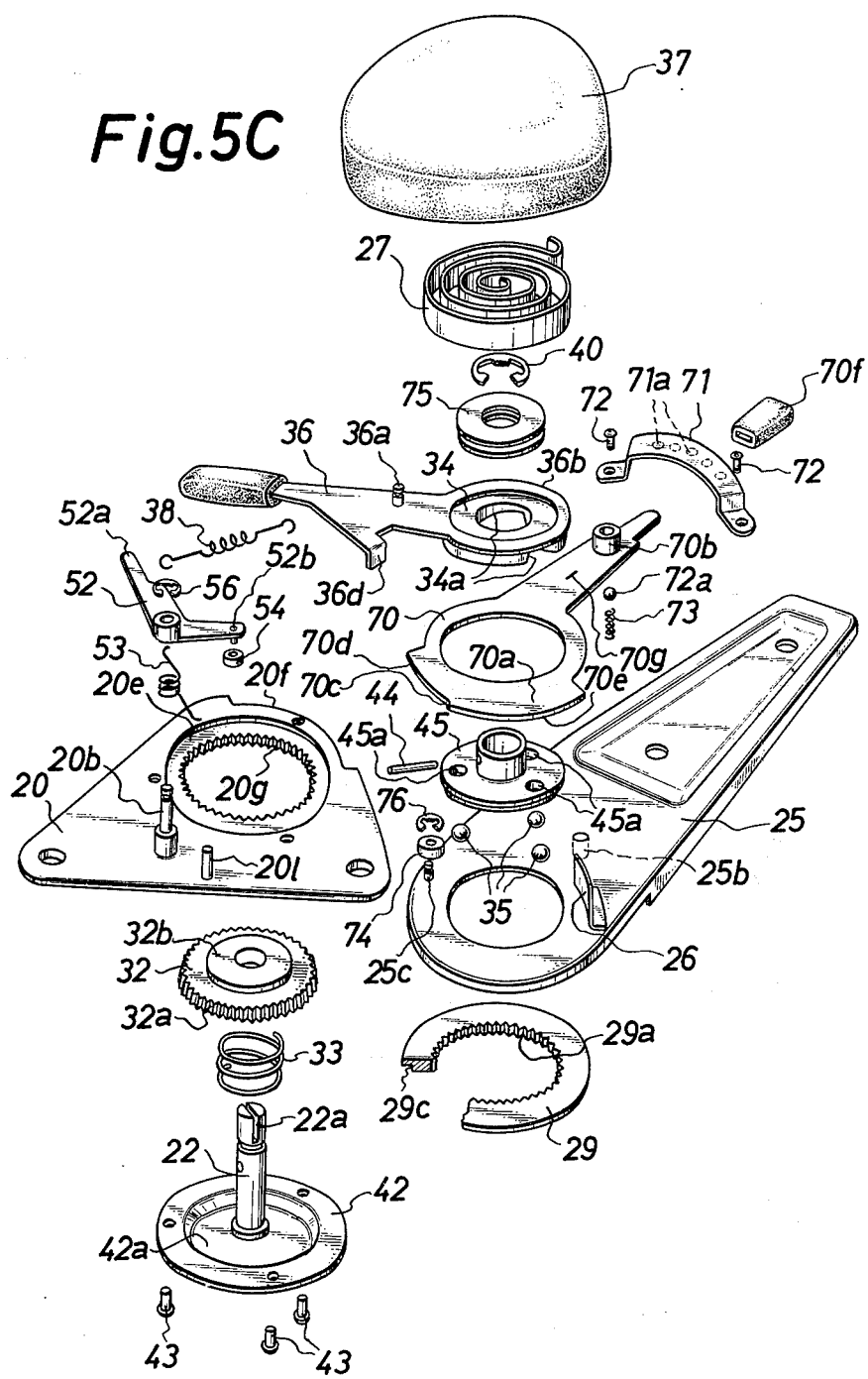

Referring to FIG. 5B particularly, on the external circumference of a guide plate 45, a memory plate 70 is rotatably fitted at its ring-shaped base 70a. On the arm 25, an arched bracket 71 is fastened spaced from a lever portion of the memory plate 70 by a screw 72 or the like. A plurality of concavities 71a are arcuately arranged on the lateral surface of the bracket 71 facing the memory plate 70. On the other hand, at a surface portion of the memory plate 70, facing the bracket 71, is provided a ball receiving cylindrical portion 70b extending nearly to said bracket 71. Inside said cylindrical portion 70b, a check ball 72a and a spring 73 are inserted, said ball 72a being pushed by said spring 73 upon one of the concave recesses 71a of the bracket 71. The position of the arm 25 relative to the memory plate 70 is changeable by rotating the memory plate 70, while said plate 70 is adapted to move according to the rotation of the arm 25. On the external circumference of the base or root portion of said plate 70, there is formed a cam face or edge 70c for releasing the forward release lever 36 held engaged by the stop lever 52, one side of which (at the left hand in FIG. 5A) is formed as a smaller external radial portion 70d and the other side of which (at the right hand in FIG. 5A) a larger external radial portion 70e.

Above the pin 20b for pivoting the stop lever 52 which tends to be normally pushed clockwise by the small force of a spring 53 whose one end is held by a stopper for the stop lever 52, a roller 74 is pivoted by the pin 25c provided on the arm 25. Thus, when the forward lever 36 is turned clockwise and the seat back 23 is inclined counterclockwise, said roller 74 allows the stop lever 52 to turn counterclockwise around the pin 20b. Thus, the end portion 52a of the stop lever 52 and the hook 36d of the forward release lever 36 are engaged with each other at a release position, and the release lever 36 is held at the release position (see FIG. 5D). This condition is maintained by the contact resistance between the stopper 52a and the hook 36d (due to the fact that the forward lever 36 tends to rotate toward the stopper 52a by the return spring 38, and that the stop lever is biased to rotate clockwise). A small clearance is provided between a roller 54 and the larger diameter cam portion 70e at the normal condition at order that the roller 54 may not obstruct the rotation of the memory plate 70. This applies to embodiments of FIGS. 6A to 6B and 7A to 7B respectively to be described later. Reference character 70f denotes a handle provided at the end of an arm position of the memory plate 70, and aligning marks 37a, 70g are provided respectively on the dust cover 37 and on the arm position of the memory plate 70. In contrast with the embodiment of FIGS. 2A to 2D wherein the cam plate 55 is formed or mounted on the base portion 25, in the embodiment of FIGS. 5A, 5B, 5C and 5D, a cam is formed on the outer circumference of the base portion of the memory plate 70. Numeral 75 is a thrust bearing for a shaft 22 provided in the space between a cam body 34 and a spring 27 and numeral 76 is a slip preventing snap ring for a roller 74.

Figure 6A:
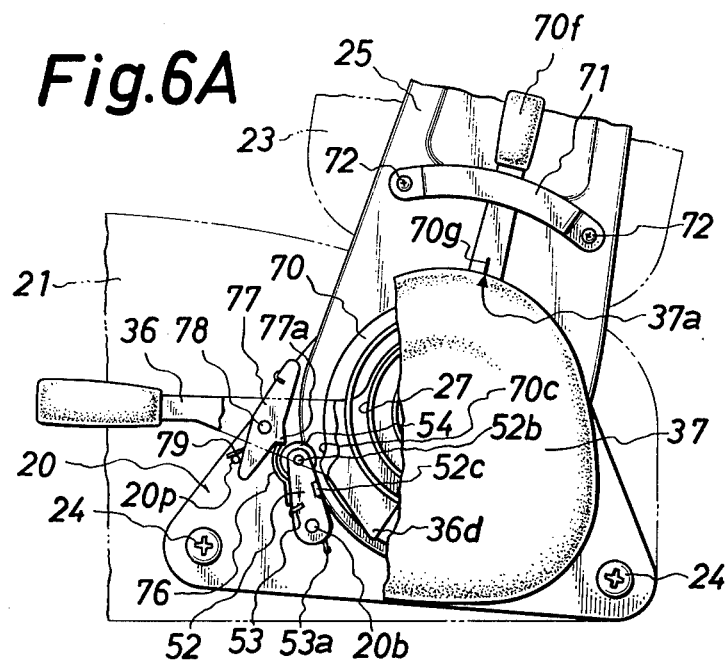
FIG. 6A is a partially broken-away side view of a sixth embodiment according to the present invention including the memory mechanism, which shows the seat back in the upstanding state.
Figure 6B:
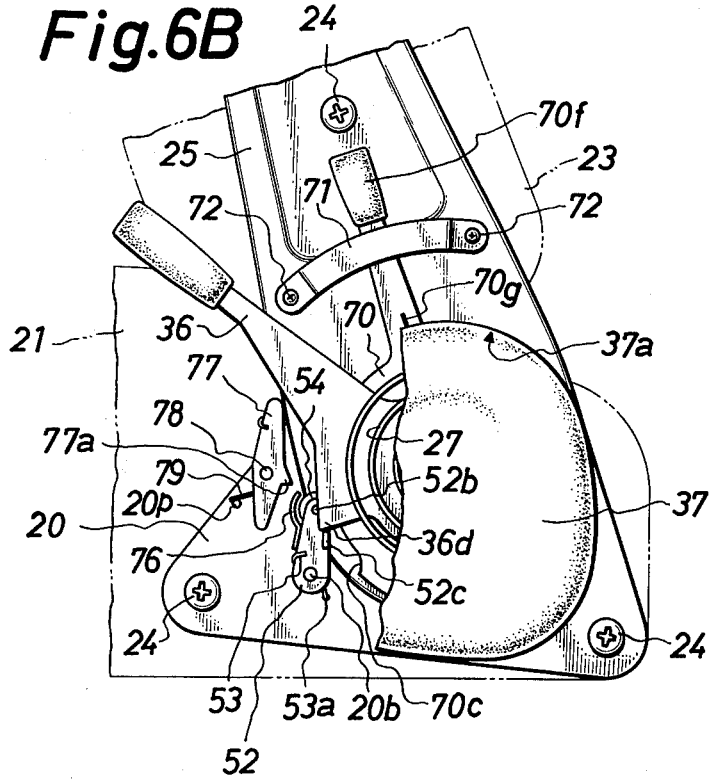
FIG. 6B is a view similar to FIG. 6A, but showings the inclined state of the seat back.

A sixth embodiment shown in FIGS. 6A and 6B is structurally similar to the fifth one shown in FIGS. 5A to 5D. However, instead of using a stop lever such as shown at 52 in FIGS. 5A to 5D, a differently shaped stop lever 52 having a roller 54 pivoted by a pin 52b at one end is pivoted at the other end by a pin 20b provided on a seat cushion base 20 and is pushed on the base portion of the memory plate 70 by a spring 53. Further, on a side edge of the stop lever 52 facing the hook 36d of the release lever 36, there is provided a stopper 52c which can hold said lever 36 at the released condition when the former is engaged with the hook 36d of the release lever 36. On the opposite side edge of said stop lever 52, a plate spring 76 is fastened at one end thereof. Instead of using the roller 74 fastened to the seat back arm 25, as seen in FIGS. 5A to 5D, a catch lever 77 which can be is turned counterclockwise by the arm 25 inclining forward (in the clockwise direction) is pivoted at a pin 78 provided on the seat cushion base 20. Said catch lever 77 is normally given the tendency to rotate in the clockwise direction arm 25) by a spring 79 whose one end is fastened to the base 20 with a stopper 20p for the catch liner. As seen in FIG. 6A, usually the turning of the stop lever 52 in the clockwise direction is obstructed by the engagement of the plate spring 76 with a projection 77a provided on a side edge of the catch lever 77, but when the seat back is forwardly inclined (in the counter direction) by turning clockwise the release lever 36 clockwise, the catch lever 77 is turned counterclockwise correspondingly by the seat back arm, thereby releasing the engagement of the projection 77a of the lever 77 with the plate spring 76. Consequently the stop lever 52 immediately turns clockwise, and engages the hook 36d of the forward release lever 36 by the stopper 52c and holds the release lever 36c at the release position. In case of the returning rotation of the seat back arm 25, the roller 54 of the stop lever 52 is pushed counterclockwise by the cam edge 70c of the memory plate 70 while the catch lever 77 is restored to the original position shown in FIG. 6A by the seat back arm 25, and thus the plate spring 76 is reengaged with the projection 77a at the position shown in FIG. 6A. Thus, the seat back can be returned to the normal position of the catch lever 77.

Referring to FIGS. 7A and 7B, a seventh embodiment of the present invention having a memory means is shown. A plurality of successive teeth 25e are formed on the external circumference of a sectional base portion of the seat back arm 25. On the seat cushion base 20, an intermediary member 80 is pivoted at a pin 81. This intermediary member includes a substantially triangular portion and an arm portion extending outward from a vertex of the triangular portion. On the intermediary member 80, a connecting or locking member 82 formed with a plurality of successive teeth 82a engagable with the teeth 25e of the member 25 is pivoted on a pin 83 provided on the intermediary member 80 near a second vertex of the triangular portion of the member 80. Accordingly, If a forward release lever 36 is turned clockwise against a spring 38, as is seen in FIGS. 7A and 7B, a projecting portion 36e provided on a side edge of the forward release lever 36 contacts and pushes a pin 80a provided on the member 80 near and inside the first vertex of the triangular portion of the member 80 to let the intermediary member turn counterclockwise. The gear engagement of the base portion of the arm 36 with the connector 82 is then released.

At the same time, corresponding to the clockwise turning of the release lever 36, a hook portion 36d of the forward lever 36, which extends substantially oppositely axially of said lever 36 also, turns downwards (in the clockwise direction). On the other hand, when the seat back arm 25 is forwards inclined, that side edge 25f of the sector portion of the seat back arm 25 closer to a pin 52b provided on the other end of the stop lever 52 coounterclockwise against the spring 53. As a result, the pin 52b engages the hook portion 36d of the release lever 36 and locks the same thereat, i.e. at the release position (FIG. 7B).

In case of the returning rotation of the seat back arm 25, when both the arm 25 and the memory plate are turned back and the roller 54 is pushed out clockwise by the cam edge 70c and then the larger external radial portion 70e, the engagement of the pin 52b with the hook 36d is released and the release lever 36 is restored to the initial position by a return spring 38. Simultaneously, a roller 84 pivoted on said lever 36 pushes the end 80b of the arm portion of the intermediary member 80 and turns said member 80 clockwise about the point 81. Accordingly, the teeth 25e of the arm 25 and the teeth 82a of the connector 82 are put into gear connection with each other. The locking member 82 has on a side edge thereof adjacent to the pin 81 a substantially semicircular notch partially surrounding the pin 81 for facilitating the engagement and disengagement of the locking member with and from the base portion of the arm member, respectively.

Figure 8:
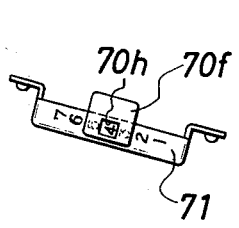
FIG. 8 is another modification view of a memory lever associated with a bracket seen in the direction of the line VIII in FIG. 5A.

Additionally, according to the abovementioned fifth, sixth and seventh embodiments, the aligning marks 70g and 37g are provided on the arm portion of the memory plate 70 and on an adjacent edge of the dust cover 37 respectively, but the angular position of the memory plate 70 may be indicated by the cooperation of a window 70h bored in bored handle 70f provided at the end of the arm portion of the memory plate 70 and marks such as numerals (graduations) arranged on the top surface of a bracket 71, one of the numerals being adapted to be seen in the window, as seen in an eighth embodiment shown in FIG. 8. Needless to say, in the fifth, sixth and seventh embodiments, each mechanism portion formed on the seat cushion base and that on the seat back arm may be mutually exchangeable.

In the operation of the reclining seat device of FIGS. 5 to 8, to determine the most suitable upstanding angle of the seat back 23, the forward release lever 36 is drawn fully in the clockwise direction. In the fifth and sixth embodiments, a cam body 34 then is turned also in the same direction, and steel ball 35 is axially pushed out to the right hand (in FIG. 5B) by the cam face 34a of said cam body 34. Thus, by the axial movement of the steel ball, the connector 32 is moved against a spring 33 in the same direction. Accordingly, the serrations 20g of the seat cushion base 20 and the serrations 29e of the ring-shaped body 29 fastened to the seat back arm 25 are respectively released from the connection with serrations 32a of the connector 32, and the seat back arm 25 may be freely inclined forwards as well as backwards within a range determined by the guide groove 20f and the guide pin 25b received therein.

Then, in the seventh embodiment, corresponding to the clockwise turning (in FIG. 7A) of the release lever 36, the intermediary member 80 is turned in such a direction that the gear connection of the seat back arm 25 with the connector 82 pivoted on the intermediary member 80 should be released, and as a result, the seat back arm 25 may be freely inclined forwards as well as backwards (clockwise and counterclockwise) relative to the seat cushion base 20.

When the seat back 23 is thus freely inclinable in both forward and backward directions, as said seat back 23 is given a tendency to incline forwards by the spiral spring 27 (shown in FIGS. 5 and 6, but not shown in FIG. 7 through it is provided in place), a driver may turn the seat back 23 to the most suitable position by his back as he sits on the seat and then return the release lever 36 to the initial position. Then the seat back arm 25 and therefore the seat back 23 are locked to the seat cushion base 20 (and therefore the seat cushion 21). Then if the memory lever 70 is turned and the mark 70g of the memory plate 70 is aligned with the mark 37a of the dust cover 37, the inclining angle of the seat back 23 is memorized.

When the marks 70g and 37a are aligned with each other in a line, as seen in the drawings, the boundary point between the larger external diameter edge 70e of the memory plate 70 and the cam edge 70c and the roller 54 of the stop lever 52 are adapted to most closely approach each other.

In order to get on and off the rear seat, if the release lever 36 is drawn fully clockwise, the seat back 23 can be inclined forwardly in the same way as described above. When the seat back 23 is forwardly inclined, each stop arm or lever 52 is turned to the release position at which the release lever 36 is held by sliding on the roller 74 in the fifth embodiment (the stop lever 52 has partially a cam edge on the side thereof facing the roller 74), by releasing the engagement of the projection 77a provided on the catch lever 77 with the plate spring 76 of the stop lever 52 in the sixth embodiment and by the pin 32b being pushed by the adjacent side edge of the sector portion of the seat back arm in the seventh embodiment, respectively.

As a result, after the clockwise turning operation of the release lever 36 against the return spring 38 is stopped, said lever 36 is held engaged at the release position by the stop lever 52.

When one wants to return the forwardly inclined seat back 23 to the initial position it is necessary only to raise the seat back 23 without touching the release lever 36. In this raised operation, when the mark 70g for the memory plate 70 turning together with the seat back arm 25 comes to align with the mark 37a for the dust cover 37, the roller 54 pivoted on each stop lever 52 in FIGS. 5, 6 and 7 comes on the cam edge 70c, at which time the stop lever 52 is turned to be released from the forward release lever 36.

Consequently, the release lever 36 is restored by the return spring 38 and locks automatically the seat back arm to the base plate 20 at the initial memorized position. Further in order to change a memorized position to improve a driver's ease in the seat and to meet his physical constitution and driving posture, he has only to repeat the same operation as described above.

Additionally, in this reclining seat device, independent of the memory device, the seat back may be placed at any desired angular position, for example at the most backward inclined position, within the working range thereof. In this case, without handling the memory plate 70, the angle of the seat back 23 may be changed and fixed only by handling the release lever 36. Then in order to return the seat back to the initially set position from this position and lock it there, it is necessary to fully pull up the release lever 36 clockwise to incline the seat back forwards, and then further to fully return the seat back.

Further, in the eighth embodiment shown in FIG. 8, any one of marks such as the numerals 1, 2, 3 and so on or graduations on, the upper surface of the bracket 71 is adapted to appear in the window or hole 70h formed in the handle 70f of the memory plate 70. In operation, the handle 70f fitted to the memory plate 70 is previously set clockwise (in case of the forward adjustment of the seat back 23) or counterclockwise (in case of the backward adjustment of the seat back 23) at a desired angle (corresponding to a certain mark) relative to the seat back arm 25, and then in the same way as seen in the fifth to seventh embodiments, the release lever 36 is fully pulled up clockwise to incline the seat back 23 forwards. Then, if the seat back 23 is returned fully, the seat back 23 may be automatically locked at the desired memorized position corresponding to the selected mark.

However, if this position is still unsatisfactory, the memory plate 70 may be set once more to a more suitable position in the same way. If a driver keeps in mind the mark indicated in the window 75 of the handle 70f, which mark corresponds to the optimal position, he may rapidly reset the seat back at the optimal position for him, even if the memory plate 70 is previously moved to another position by others. In this case also, needless to say, it is possible to adjust the memory position and the seat position. Further the back lever handling device shown in the second embodiment may be incorporated also respectively in the fifth, sixth, seventh and eighth embodiments.

According to the above described embodiments shown in FIGS. 5 to 8, the seat back may be rapidly returned from any seat back position to the most suitable position initially set, and the operation therefor may be practised simply and easily by forwardly inclining and then backwards returning the seat back without any need to handle the seat back by trial and error.

Referring to the ninth and tenth embodiments shown in FIGS. 9A to 9E and FIGS. 10A to 10B respectively, there are shown reclining seat devices operatable by or either at the front seat or rear seat and including memory means. Except the memory means, the structure of the ninth embodiment shown in FIGS. 9A to 9E is similar to that of the second embodiment shown in FIGS. 2A to 2D. Accordingly, some structural portions of the ninth embodiment different from those of the second embodiment will be mainly described in the following.

A substantially ring-shaped memory plate 85 is pivotably and concentrically mounted on the external circumference of the guide plate 45 and the circumference thereof is formed with a requisite number of teeth 85a. Further, an arched slot 85b concentric with the shaft 22 is an escape groove for the hook 26 and, in the present embodiment, the length thereof corresponds to a seat back adjusting range from the most forward limit to the most backward limit.

A substantially arched memory arm 86 is pivoted midway of the length thereof at a pin 25d secured in the seat back arm. The arched arm 86 locks the seat back arm 25 relative to the memory plate 85 and one end of the arm 86 is provided on a side edge thereof with a pawl 86a engagable with the memory plate teeth 85a. The pawl 86a engagable with the memory plate teeth 85a. The pawl 86a is given a tendency to engage with the teeth 85a by a bias spring 88. When said pawl 86a is engaged with the teeth 85a the center of an assumed circle which includes as a part of the circumference thereof the inside edge 86c of the memory arm 86 facing the memory plate 85 is adapted to coincide with that of the shaft 22. A small clearance is allowed between the inside edge 86c of the arm 86 and a pin 87 provided on the back lever 46.

In order to change the angle of the seat back 23, it is necessary to change the position of the seat back arm 25 relative to the memory plate 85. The teeth 85a and the engagable pawl 86a are respectively formed triangular so that they may be easily released from each other by a fixed force.

A substantially arched hook arm 89 for locking the memory plate 85 to the seat cushion base 20 is pivotably supported at one (lower) end thereof by a pin 20m firmly secured in the seat cushion base 20. On the substantial center of the inner side edge of the hook arm 89 is formed a depression 89a for receiving and locking therein a projection 85c provided on the external circumference of the memory plate 85. This hook arm is given a tendency to turn toward the projection 85c of the memory plate 85 by a spring 90 fastened at one end to the base plate 20. The pin 87 firmly secured in the back lever 46 and an arcuate intermediate lever 91 forms a release means by which the memory plate 85 is released from the lock of the hook arm 89 in the forward inclining operation of the seat back 23 before the release of the ring-shaped body 29 from the locking member 32 by the steel balls 35. The upper end of the arcuate lever 91 is pivotably supported at the pin 25d, and the lower end thereof contacts the inner edge of the upper end of the hook arm 89. Further, between the upper portion of the inner edge 91a of the intermediate lever 91 and the pin 87, a certain clearance is formed such that the engagement of the depression hook 89a of the lever 89 with the projection 85c of the plate 85 should not be obstructed. Even if the seat back is forwardly inclined, the hook arm 89 is adapted to be held in a fixed position by a roller 92 pivotably supported on a pin 89b secured in the hook arm 89 and contacting the outer circumference of the semicircular base portion of the seat back arm 25. A stopper 86d fastened to the memory arm 86 limits the movement of the intermediate lever 91.

Figure 10A:
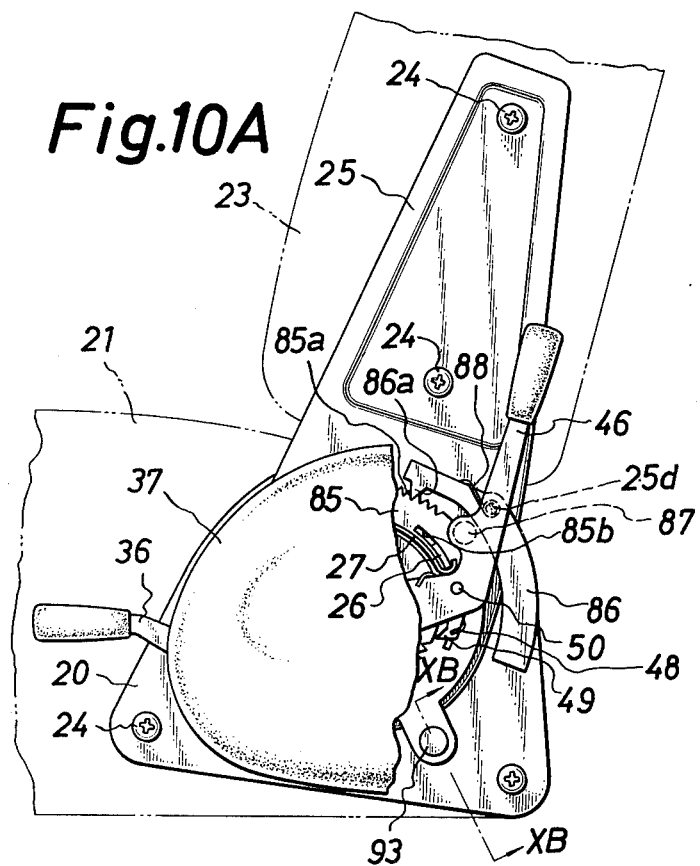
FIG. 10A is a side view of a tenth embodiment according to the present invention including the memory mechanism and the back handling mechanism, a part of which is shown broken away.
Figure 10B:
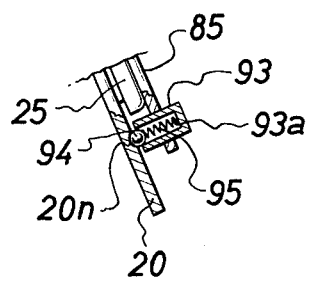
FIG. 10B is a fragmentary side view taken on line XB—XB in FIG. 10A.
Figure 9E:
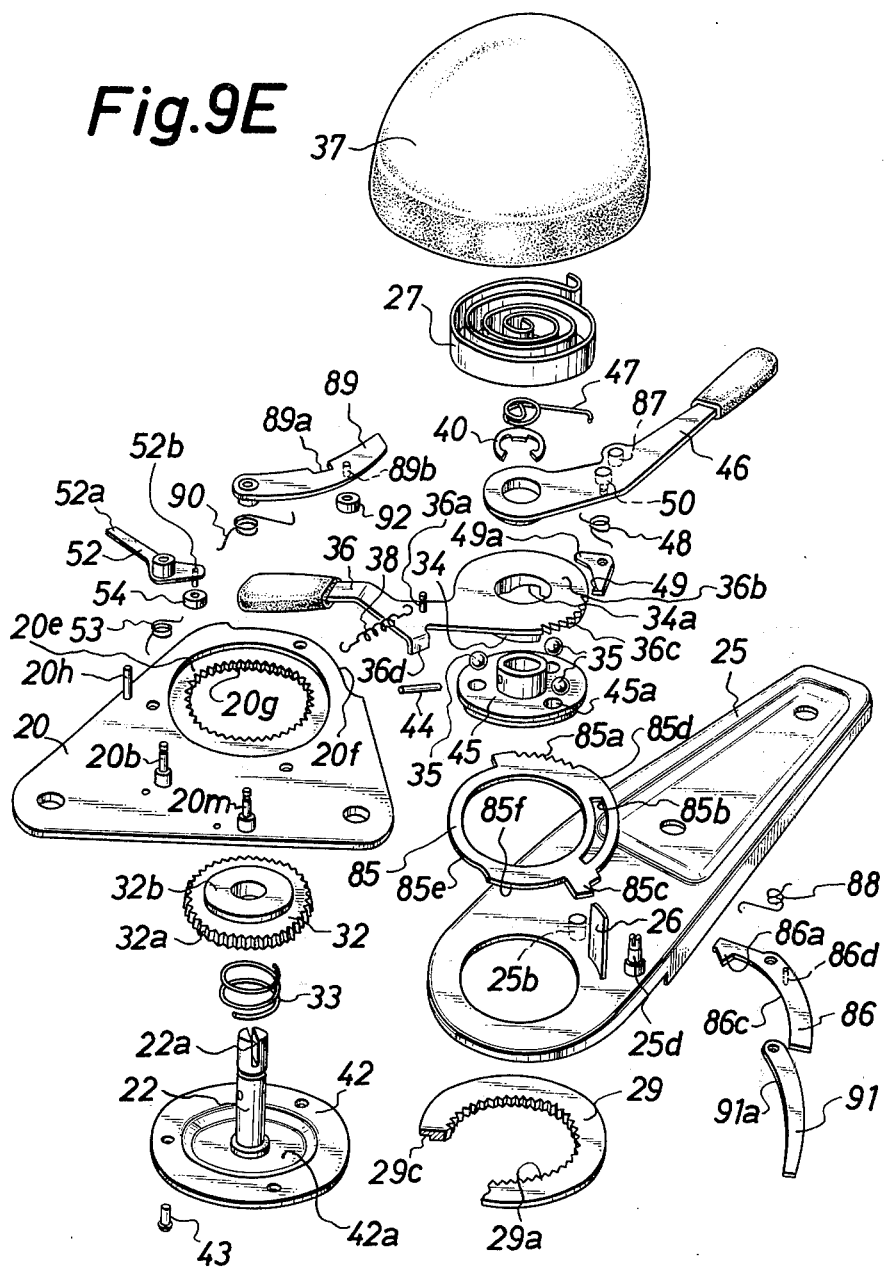
FIG. 9E is an exploded view in perspective of the ninth embodiment, a part of which is shown in a fragmentary form.

Referring to FIGS. 10A and 10B, there is shown a tenth embodiment of the present invention concerning the memory plate locking device.

A cylindrical member 93 open at one end and closed at the other end is perpendicularly secured to a radially externally extending portion of the memory plate 85. In the cylindrical member 93 are enclosed a ball 94 and a spring 95 for urging the ball 94 through the opening of the cylindrical member 93 into a conical hole 20n bored in the seat cushion base 20, and thus, the memory plate 85, can be locked into the seat cushion base 20. The strength of the spring 95 and the depth of the hole 20n are such that the locking strength obtained between both members should be larger than that of the gear connection of the memory plate 85 with the memory arm 86.

In the operation of both ninth and tenth embodiments, in order to adjust the angle of the seat back 23, front lever 36 is drawn clockwise and then successive operations are effected in the same way as seen in the embodiments described above.

During this operation of the seat back, the memory plate 85 is locked to the base plate 20 by the locking means (the depression 89a of the hook arm 89 and the protrusion 85c of the memory plate 85 in FIG. 9A; the ball 94 and the depression 20n of the base plate 20 in FIG. 10B). Accordingly, when the seat back 23 is manually inclined forwardly (counterclockwise) or backwardly (clockwise) for a desired position, the pawl 86a of the memory arm 86 is disengaged from and slides on the teeth 85a of the memory plate 85. When the desired position is found, the pawl 86a is engaged with the teeth 85a to memorize the position and thus the seat back is locked to the base plate 20 at a corresponding desired angle. In either of the ninth and the tenth embodiments, the successive teeth 85a are formed on and through a certain outer circumferential portion of the memory plate 85 corresponding to the range of the sitting attitudes of drivers, and not on the more backward circumferential portion of the plate 85. Accordingly, when the seat back is backwardly inclined out of the desired range of the driver's attitudes, the pawl 86a contacts the outer circumferential portion 85d of the memory plate 85. Further, in these ninth and tenth embodiments, because of the limited length of the arched groove 85b, the seat back can not be laid fully forwards.

Next, explanation is made of a case where the seat back 23 is forwardly inclined by the back lever 46.

When the back lever begins to be turned clockwise, the pin 87 moves clockwise bearing against the inside cam edge 91a of intermediate lever 91. This causes the lever 91 to rotate counterclockwise around the pin 25d and, in turn, to rotate the hook arm 89 clockwise about the pin 20m. By this latter operation, the memory plate 85 is unlocked from the hook arm 89, at which time the pawl 49 pivoted on the back lever 46 is no longer pressed counterclockwise by the hook 26 and so the pawl 49 is engaged with the ratchet 36c. When the backward lever 46 is further turned clockwise, the forward lever 36, having the ratchet 36c on the outer circumference of the circular portion 36d thereof, is also turned clockwise by the pawl 49 engaged with the ratchet 36c. As a result, the ringed body 29 is disconnected from the locking member 32 and the seat back is forwardly inclined. Subsequently when the back lever 46 is released, said lever 46 is returned to the initial position by the elasticity of spring 47. (see FIG. 9D). When the seat back is turned forwardly, the roller 54 pivoted on the stop lever 52 contacts the smaller external diameter portion 85e of the memory plate, and correspondingly the stop lever 52 is turned counterclockwise. Thus the end portion 52a of said lever 52 engages with the hook 36d formed on the side edge of the front lever 36 to hold the front lever 36 in the release position. When the seat back is manually returned to the original angular position (it is possible to do so because the seat back is unlocked at this time.), the roller 54 rolls on the smaller external diameter portion 85e and then on the larger external diameter portion 85f. Correspondingly, the stop lever 52 is turned clockwise and the end portion 52a of the stop lever 52 is disengaged from the hook 36d of the forward lever 36 at the boundary point of the smaller and larger external diameter portions 85e and 85f. This instantly returns the front lever 36 to the initial position to lock the seat back 23 at the memorized angular position.

Referring next to the tenth embodiment shown in FIGS. 10A and 10B, the locking force between memory plate 85 and the seat cushion base 20 is large as compared to that between the memory plate 85 and the memory arm 86. Accordingly, the memory plate 85 will not be disengaged from the base plate 20 at the time of adjusting the inclination angle of the seat back 23. When the back lever is drawn clockwise to incline the seat back 23 forwardly, the clockwise moved pin 87 obstructs the disconnection of the memory arm 86 from the memory plate 85 by bearing against the memory arm 86 counterclockwise. When the back lever 46 is further drawn clockwise, the front lever clutch 49 is engaged with the ratchet 36c of the front lever, thereby turning the front lever clockwise in the same way as mentioned above. This causes the locking member 32 to be disengaged from the ringed body 29 secured to the seat back arm 25. In the particular embodiment, the force to incline the seat back arm 25 forwardly by the spring 27 is selected to be greater than the locking force produced between the memory plate 85 and the base plate 20 due to the mechanism shown in FIG. 10B. Thus, the seat back 23 will be inclined forward.

While the invention has been described hereinabove in terms of a number of preferred embodiments thereof, the invention itself is not limited thereto but rather comprehends all modifications of those embodiments properly falling within the spirit and scope of the appended claims.

What we claim is:
1. Device for setting a seat back at a desired angular position relative to a seat cushion to which said seat back is pivotably connected, said seat back and said seat cushion forming a seat, comprising:
   a. a base plate secured to a side surface of said seat cushion, said base plate having a fixed shaft,
   b. an arm member including a base portion pivotably mounted on said shaft, and an arm portion integral with said base portion and fixed to the side surface of said seat back,
   c. a spring means for biasing said arm member forwardly about said shaft,
   d. means for normally locking said arm member to said base plate, and
   e. means for unlocking said arm member from said base plate, said unlocking means including a forward release lever pivotably supported by said shaft at the base portion of said forward lever,
   said locking means including two substantially ringed bodies secured to said arm member and said base plate, respectively, and concentric with said fixed shaft of said base plate, said two ringed bodies having serrations tapered axially on the internal surfaces thereof, respectively, said locking means comprising a locking member adapted to move axially and engage with the internal openings of said ringed bodies, said locking member having a complementary serration provided through and on the outer circumference thereof, and a spring means disposed on the side of the greater diameter end surface of said locking member for pushing said locking member axially to engage with said two ringed bodies respectively.

2. Device according to claim 1, wherein said unlocking means further includes a cam member pivotably supported at said shaft of said base plate and having at least one cam surface facing the smaller diameter end surface of said locking member, a corresponding number of holes bored in said base plate, the same number of balls disposed in said holes of said base plate and adapted to pass axially through said holes respectively between said smaller diameter end surface of said locking member and said cam surface of said cam member whereby a releasing rotation of said forward lever causes said cam surface of said cam member to move axially said balls and push outwardly said locking member against said second spring means to disengage said locking member from said ringed body secured to said base plate.

3. Device according to claim 2, further including a spring means having a tendency to return said forward lever to an initial position thereof, and means for limiting the swing range of said arm member secured to said seat back, said limiting means including a certain length of arched slot and a pin member movable in said slot, one of said slot and said pin member being provided in said arm member, the other being provided in said base plate.

4. A device for setting a seat back at a desired angular position relative to a seat cushion to which said seat back is pivotably connected, said seat back and said seat cushion forming a seat, comprising:
   a base plate secured to a side surface of said seat cushion, said base plate having a fixed shaft, an arm member including a base portion pivotably mounted on said shaft, and an arm portion integral with said base portion and fixed to the side surface of said seat back, a spring means acting to forwardly incline said arm member about said shaft, means for normally locking said arm member to said base plate, and means for unlocking said arm member from said base plate, said unlocking means including a forward release lever pivotably supported by said shaft at the base portion of said forward lever, the improvement wherein said locking means includes means defining two openings respectively associated with said arm member and said base plate, and concentrically disposed with respect to said fixed shaft of said base plate, said two openings being formed with respect axially tapered serrations, a locking member disposed concentrically with said shaft and adapted to move axially and partially engage said openings, said locking member having a complementary serration on the outer circumference thereof, second spring means disposed on the side of the greater diameter end surface of said locking member for axially pushing said locking member to engage with said two openings respectively, said unlocking means further including a cam member pivotably supported at said shaft of said base plate and having at least one cam surface facing the smaller diameter end surface of the said locking member, a plurality of balls disposed between said smaller diameter end surface of said locking member and said cam surface of said cam member and adapted to be driven by said cam member to push said locking member outwardly against the action of said second spring means to disengage said locking member from said openings.

5. Device according to claim 4, further including means for limiting the swing range of said arm member secured to said seat back, said limiting means including a certain length of arched groove and a pin member movable in said groove, one of said groove and said pin member being provided within said arm member, the other being in said base plate.

6. Device according to claim 4, wherein said means defining said two openings comprises two ringed bodies secured to said base plate and said arm member, respectively.

7. Device according to claim 6, further including a ball guiding plate concentrically and perpendicularly secured to said shaft between said locking member and said cam member, said guiding plate having holes for guiding said balls to push said locking member away from said openings by the operation of said cam member.

8. Device according to claim 7, wherein one of said ringed bodies has a side surface with a concentric axially raised circular rotatably fitted in a corresponding recess provided in an adjacent side surface of the other ringed body and concentric with the opening therein.

9. Device according to claim 4, wherein said forward release lever includes a disk-like base portion with a ratchet on the external circumference thereof, a backward release lever being pivotably mounted at said shaft of said base plate and including a pawl member thereon for engaging with said ratchet to rotate said forward release lever together with said backward release lever in the releasing direction during a releasing operation.

10. Device according to claim 9 comprising a spring acting on said pawl member to urge the same to engage with said ratchet of said forward release lever, a further spring acting on said backward release lever to urge the same to return to its rest position relative to said arm member, and a pin on said arm member for preventing said pawl member from engaging with said ratchet of said forward release lever when said backward lever is at the rest position thereof.

11. Device according to claim 4 wherein said forward lever includes a disk base portion, a backward release lever being pivotably mounted at said shaft and including a roller member pivoted thereon for pressing the outer circumference thereof against the base portion of said forward release lever to rotate the latter together with said backward release lever in the releasing direction during the releasing operation.

12. Device according to claim 11, comprising a return spring acting on said backward release lever to return the same to its rest position relative to said arm member.

13. Device according to claim 10, wherein said arm member includes an arched cam plate secured to said base portion of said arm member along the outer circumference thereof, said cam plate including larger and smaller external diameter portions and a cam portion connecting said larger portion with said smaller portion, a stop lever pivoted on said base plate said stop lever including a roller member pivoted at one end thereof, urged against the outer circumference of said cam plate, said forward release lever including a hook portion on a side edge thereof arranged such that the releasing operation of said forward release lever causes said hook portion to engage the other end of said stop lever.

14. Device according to claim 11, wherein said backward release lever includes a branch member mounted thereon, said branch member including a plate portion extending parallel to said backward release lever, a roller member pivotably supported on said backward release lever, said roller member being movably supported at both ends of the shaft thereof in cross slots provided in said backward lever and said plate portion of said branch member respectively, a transverse member extending across the space between said backward release lever and said branch member, said transverse member being positioned substantially parallel to and spaced from said slots and being substantially in contact with the outer circumference of said roller member, a spring member extending from said plate transverse member to said roller member for pressing the latter against said outer circumference of said base portion of said forward lever, a pin member on said arm member for limiting the swinging operation of said backward release lever in the return direction and for preventing said roller member from being pressed against the outer circumference of said base portion of said forward lever.

15. Device according to claim 6, further including a substantially ring-like memory plate supported pivotably around said shaft of said base plate between said base plate and that ringed body secured to said base plate, said memory plate including means including a pin for positioning said memory plate relative to said base plate, said pin being insertable into any desired one of a plurality of holes provided in an arcuate array in said base plate, said ring-like memory plate including a plurality of protrusions extending radially internally and spaced equally on the internal circumference thereof, said smaller diameter end surface of said locking member having on the substantially outer circumference thereof a plurality of protrusions extending axially toward said memory plate, said axial protrusions of said locking member being substantially equal in number to said radial protrusions of said memory plate, whereby releasing rotation of said forward release lever causes the ends of said axial protrusions on said locking member to contact adjacent side surfaces of respective said radial protrusions on said memory plate, the returning rotation of said seat back causing said axial protrusions on said locking member to slide on said adjacent side surfaces of said radial protrusions on said memory plate and come off corresponding side edges of said radial protrusions, respectively, to lock said seat back arm member relative to said base plate.

16. Device according to claim 15, wherein the positioning means further includes a cylindrical portion extending perpendicularly to a portion extending radially outwardly from and integral with said memory plate, said pin being enclosed in said cylindrical portion and including an integral knob at the end thereof remote from said radially outwardly extending portion of the memory plate, and a boss portion, the other end portion of said pin being adapted to be exposed externally of said cylindrical portion, and a spring member disposed in said cylindrical portion for pressing against said boss portion to insert said other end portion of said pin into any predetermined one of said plurality of holes provided in said base plate.

17. Device according to claim 15, wherein said ringed body secured to said base plate has a depression in the side surface thereof facing said base plate, in which said memory plate is accommodated so as to rotate about said shaft of said base plate through a predetermined range.

18. Device according to claim 15, wherein said base plate has a plurality of arched escape slots formed concentrically with said shaft, in which slots said axial protrusions of said locking member are movably received.

19. Device according to claim 4, further including a stop lever pivotably supported on said base plate for holding, at the rest position, said forward lever in disengaged position when said arm member is unlocked from said base plate by the releasing operation of said forward lever, a memory plate including a substantially disk-like portion supported rotatably about and concentrically with said horizontal shaft, said disk-like portion having on the outer circumference thereof a cam portion for actuating said lever to detach said forward lever from said stop lever at a desired return position, and a lever portion integral with said disk-like portion and extending radially outwardly thereof, and means for holding said lever portion of said memory plate at a desired angular position with respect to said seat back arm member.

20. Device according to claim 19, wherein said stop lever is pivoted substantially at the center thereof on said base plate, said stop lever including a pivotable roller at one and thereof, which roller is adapted to slide on the cam portion of said memory plate, said stop lever being normally biased to rotate in an opposite direction to the direction in which said stop lever will be rotated to engage at the other end with a hook portion provided on a side edge of said forward lever to hold the forward lever at a release position, said seat back arm member including a roller member near the outer circumference of the base portion thereof for pushing said other end of said stop lever to rotate the same to said release position when said arm member is forwardly turned.

21. Device according to claim 19, wherein said means for holding said lever portion of said memory plate includes a holder secured to a side surface of said lever portion of said lever portion of said memory plate, a spring member inserted in said holder, a ball means in said holder and urged outwards by said spring member, and a bracket member supported above said arm member, said bracket member having a plurality of depressions disposed in an arc in that side surface thereof facing said ball, any certain one of which depressions is adapted to receive partially said outwardly urged ball when the latter comes to a position opposite said certain depression by rotating said memory plate.

* * * * *